United States Patent
Klassen et al.

(10) Patent No.: US 12,258,967 B2
(45) Date of Patent: Mar. 25, 2025

(54) ENERGY TRANSFER MACHINE FOR CORROSIVE FLUIDS

(71) Applicant: Genesis Advanced Technology Inc., Surrey (CA)

(72) Inventors: James Brent Klassen, Osoyoos (CA); Alexander Korolev, Burnaby (CA)

(73) Assignee: Genesis Advanced Technology Inc., Surrey (CA)

( * ) Notice: Subject to any disclaimer, the term of this patent is extended or adjusted under 35 U.S.C. 154(b) by 0 days.

(21) Appl. No.: 18/642,412

(22) Filed: Apr. 22, 2024

(65) Prior Publication Data

US 2024/0271618 A1    Aug. 15, 2024

Related U.S. Application Data

(63) Continuation of application No. 17/947,025, filed on Sep. 16, 2022, now Pat. No. 11,965,509.

(Continued)

(51) Int. Cl.
*F04C 2/08*    (2006.01)
*F04C 2/10*    (2006.01)
(Continued)

(52) U.S. Cl.
CPC .............. *F04C 2/102* (2013.01); *F04C 2/084* (2013.01); *F04C 15/0003* (2013.01);
(Continued)

(58) Field of Classification Search
CPC ........ F04C 2/084; F04C 2/102; F04C 15/003; F04C 29/02; F04C 29/042; F04C 23/008;
(Continued)

(56) References Cited

U.S. PATENT DOCUMENTS 2,389,728 A    11/1945   Hill
3,117,561 A     1/1964   Bonavera
(Continued)

FOREIGN PATENT DOCUMENTS

DE         4104397 A1    9/1991
DE    103 14 820 A1    12/2004
(Continued)

OTHER PUBLICATIONS

EP579981A1—Hertell—Internally-Toothed Gear Pump for Hydraulic Fluid Has Micron-size Gap Between Non-driving Gear-teeth Flanks at Bottom Dead-Centre—Jan. 26, 1994—English Machine Translation. (Year: 1994).*

(Continued)

*Primary Examiner* — Theresa Trieu
(74) *Attorney, Agent, or Firm* — Seed IP Law Group LLP

(57) ABSTRACT

An internal gear pump or motor includes inner and outer rotors that mesh together. An internal electric motor or generator may include a stator supported by a support element that passes through bearings of the outer rotor and the inner rotor may act as a rotor of the electric motor or generator. With or without the stator, the support element may support bearings of the inner rotor. Fluids may be supplied via the support element for cooling, lubrication or to flush a working fluid out of portions of the pump or motor, such as bearings. Flushing may also occur via channels in the housing. Axial faces of one of a pair of adjacent elements may include portions for improved axial sealing and wearing in of the other of the pair. Fluid may enter and exit chambers between the inner and outer rotors by radial ports.

4 Claims, 22 Drawing Sheets

Related U.S. Application Data

(60) Provisional application No. 63/349,024, filed on Jun. 3, 2022, provisional application No. 63/315,082, filed on Feb. 28, 2022.

(51) Int. Cl.
*F04C 15/00* (2006.01)
*F04C 29/02* (2006.01)
*F04D 29/68* (2006.01)
*F04C 29/04* (2006.01)

(52) U.S. Cl.
CPC ............ *F04D 29/685* (2013.01); *F04C 29/02* (2013.01); *F04C 29/042* (2013.01); *F04C 2210/1055* (2013.01); *F04C 2210/1094* (2013.01); *F04C 2220/20* (2013.01); *F04C 2240/40* (2013.01); *F04C 2240/50* (2013.01)

(58) Field of Classification Search
CPC ...... F04C 2210/1055; F04C 2210/1094; F04C 2220/20; F04C 2230/91; F04C 2230/92; F04C 2240/20; F04C 2240/40; F04C 2240/50
See application file for complete search history.

(56) References Cited

U.S. PATENT DOCUMENTS

| | | | |
|---|---|---|---|
| 3,758,243 | A | 9/1973 | Fox |
| 3,887,311 | A | 6/1975 | Louzecky |
| 4,100,664 | A | 7/1978 | Straesser |
| 4,111,572 | A * | 9/1978 | Noone ................... H02K 44/10 403/28 |
| 5,720,251 | A | 2/1998 | Round et al. |
| 5,820,504 | A | 10/1998 | Geralde |
| 6,089,843 | A | 7/2000 | Kondoh |
| 6,273,695 | B1 | 8/2001 | Arbogast et al. |
| 6,893,239 | B2 | 5/2005 | Pippes |
| 8,821,138 | B2 * | 9/2014 | Holtzapple .............. F04C 2/102 418/61.3 |
| 9,127,671 | B2 | 9/2015 | Ono et al. |
| 9,670,924 | B2 | 6/2017 | Holtzapple et al. |
| 10,890,181 | B2 | 1/2021 | Rosenbarger |
| 11,549,507 | B2 | 1/2023 | Klassen et al. |
| 2005/0063851 | A1 | 3/2005 | Phillips |
| 2012/0051948 | A1 | 3/2012 | Dirscherl et al. |
| 2012/0248903 | A1 | 10/2012 | Cullen et al. |
| 2014/0299094 | A1 | 10/2014 | Li |
| 2016/0273535 | A1 | 9/2016 | Ejim et al. |
| 2017/0370359 | A1 | 12/2017 | Kimura et al. |
| 2018/0172000 | A1 | 6/2018 | Hattori et al. |
| 2020/0300243 | A1 | 9/2020 | Rosenbarger |
| 2022/0397113 | A1 * | 12/2022 | Klassen ................. F04C 2/102 |

FOREIGN PATENT DOCUMENTS

| | | |
|---|---|---|
| DE | 11 2006 003 136 T5 | 10/2008 |
| DE | 102012214243 A1 | 2/2014 |
| EP | 0661454 A1 | 11/1994 |
| EP | 1493926 A2 | 6/2004 |
| EP | 3 212 935 B1 | 10/2019 |
| JP | 3397411 B2 | 4/2003 |
| JP | 6481399 B2 | 3/2019 |

OTHER PUBLICATIONS

EP3212935B1—Kuehner et al.—Internal Gear Pump and Method of Pumping—Oct. 2, 2019—English Machine Translation. (Year: 2019).*

JP2014206072A—Suzuki et al.—Gear Pump And Electric Pump—Oct. 30, 2014—English Machine Translation. (Year: 2014).*

Gupta, A. et al., 'Wankel Rotary Engine's Apex Seal/Trochoid Wear Chatter the Devil's Nail Marks Persist', *International Journal of Scientific and Research Publications*, 9(4):2250-3153, Apr. 2019, 6 pages.

Warren, S., "New Rotary Engine Designs by Deviation Functions Method," UCLA Electronic Theses and Dissertations, University of California, Los Angeles, 2012, 138 pages.

Thomas A Xometry Company, 'All About Internal Gear Pump—What They are and How They Work,' Article downloaded from Insights. https://www.thomasnet.com/articles/pumps-valves-accessories/internal-gear-pumps. pp. 1-4; Jul. 8, 2021.

* cited by examiner

ENERGY TRANSFER MACHINE FOR CORROSIVE FLUIDS

TECHNICAL FIELD

Gear Pumps

BACKGROUND

Gear pumps are well known in the art, but further improvements are desired, for example in efficiency,

SUMMARY

An energy transfer machine may include an inner rotor and an outer rotor rotating with meshing projections in order to drive or be driven by a fluid.

For example, in an embodiment shown in FIGS. 1-12, an energy transfer machine comprises a housing 2090, an inner rotor 3000 and outer rotor 3005, the rotational axis of inner rotor 3000 and rotational axis of outer rotor 3005 being largely parallel, but having non-concentric axes, the outer rotor 3005 having inward-facing projections 2010, outer rotor inward-facing projections shown in FIG. 2, and the inner rotor 3000 having outward-facing projections 2015, inner rotor outward-facing projections shown in FIG. 2, with the inner and outer rotor projections meshing together to form chambers 1020, the aforementioned chambers shown for example in FIG. 2 and in FIG. 12, the chambers having sealed volumes which expand and contract.

An energy transfer machine as described in this document may be used for example as a pump in non-compressible fluid applications or as a compressor in compressible fluid applications. The machine may be driven by for example by an external motor or by an integrated electric motor as described in some embodiments below. In some embodiments the energy transfer machine may be used as a hydrogen recirculation blower (HRB) which is a type of hydrogen gas compressor commonly used in hydrogen fuel cells.

In various embodiments, the energy transfer machine, and/or if present any integrated electric motor, may be supplied with fluids for cooling and/or lubrication. In the case of the machine being an HRB for a hydrogen fuel cell, either or both of the hydrogen fed to the HRB, or water separated from the hydrogen recirculation loop by a water separator, may be used for cooling purposes as further described below.

In an embodiment the areas surrounding bearings (such as but not limited to roller bearings, plain bearings, bushings, fluid bearings, and magnetic bearings) are subjected to positive pressure dry gas, called bearing flushing fluid, so as to protect the bearings from moisture and/or other harmful constituents present in the working fluid of the energy transfer machine. In a non-limiting embodiment, the energy transfer machine is a hydrogen recirculation blower (HRB) and the dry bearing flushing gas is hydrogen.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Energy Transfer Machine

The inventor discloses designs and methods for operation of energy transfer machines and systems including the same. Features of the energy transfer machine may include, for example, a novel integrated motor construction allowing compact size and high efficiency, an eccentric shaft with channels for routing of an injected fluid, routing of wiring, routing of a cooling fluid, routing of grease, or any combination of these, the channels allowing for cooling, lubrication, and durability benefits, channels for routing of a bearing flushing fluid allowing for increased lifetime of bearings or fluid sensitive components in applications where a corrosive working fluid is present. The inventor further discloses embodiments using a novel outer rotor with radial passageways allowing the use of radial ports, as opposed to the axial ports disclosed in Ser. No. 17/508,885, now U.S. Pat. No. 11,549,507. Whereas with axial ports the working fluid takes a sharp 90-degree turn then entering and exiting the machine, with radial ports the working fluid has a smooth, gradual path when entering and exiting the device. During extensive bench testing the inventor has observed notably higher efficiency using radial ports as opposed to axial ports. Additionally, radial ports allow for the elimination of port plates disclosed in Ser. No. 17/508,885, now U.S. patent Ser. No. 11/549,507 and reduced form factor. A possible additional benefit is quieter operation. The inventor also discloses raised portions located on an inner rotor allowing for reduced friction, increased lifetime, and improved efficiency, or any combination of these features.

Figure 1:
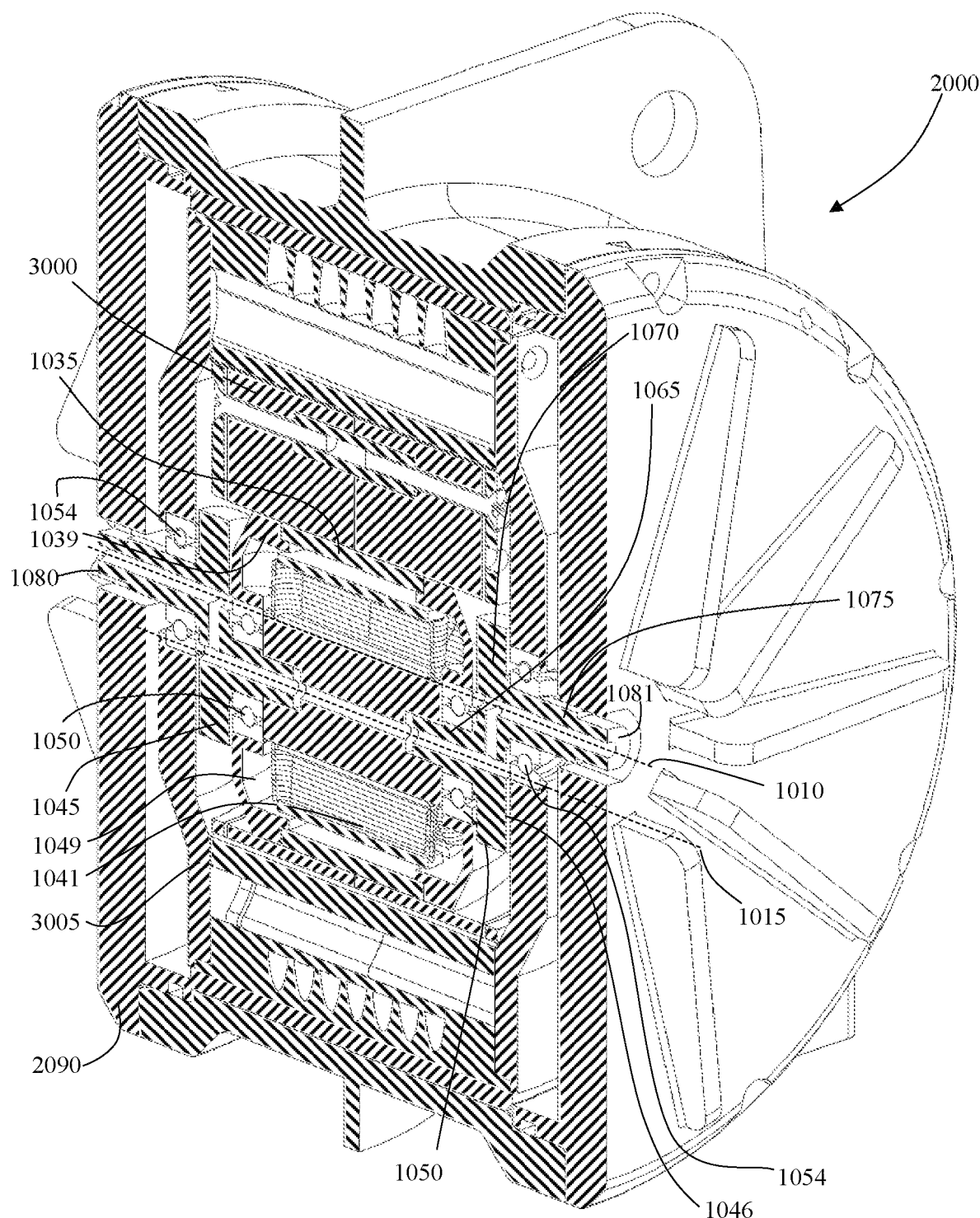
FIG. 1 is an isometric cutaway view of an exemplary energy transfer machine, with a cut plane including a central axis of the energy transfer machine.
Figure 2:
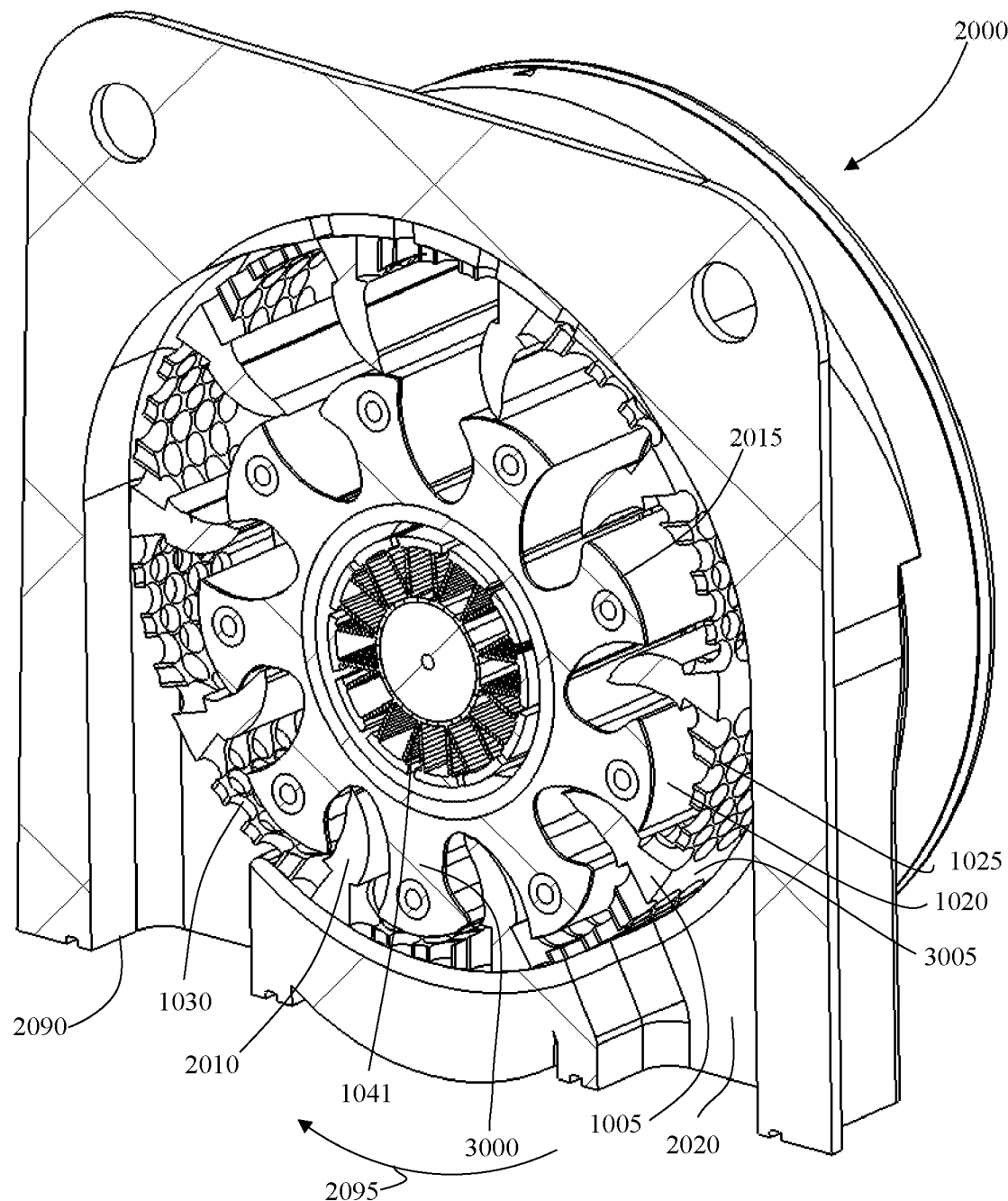
FIG. 2 is a further isometric cutaway view of the exemplary energy transfer machine of FIG. 1, with a cut plane perpendicular to the axis.
Figure 3:
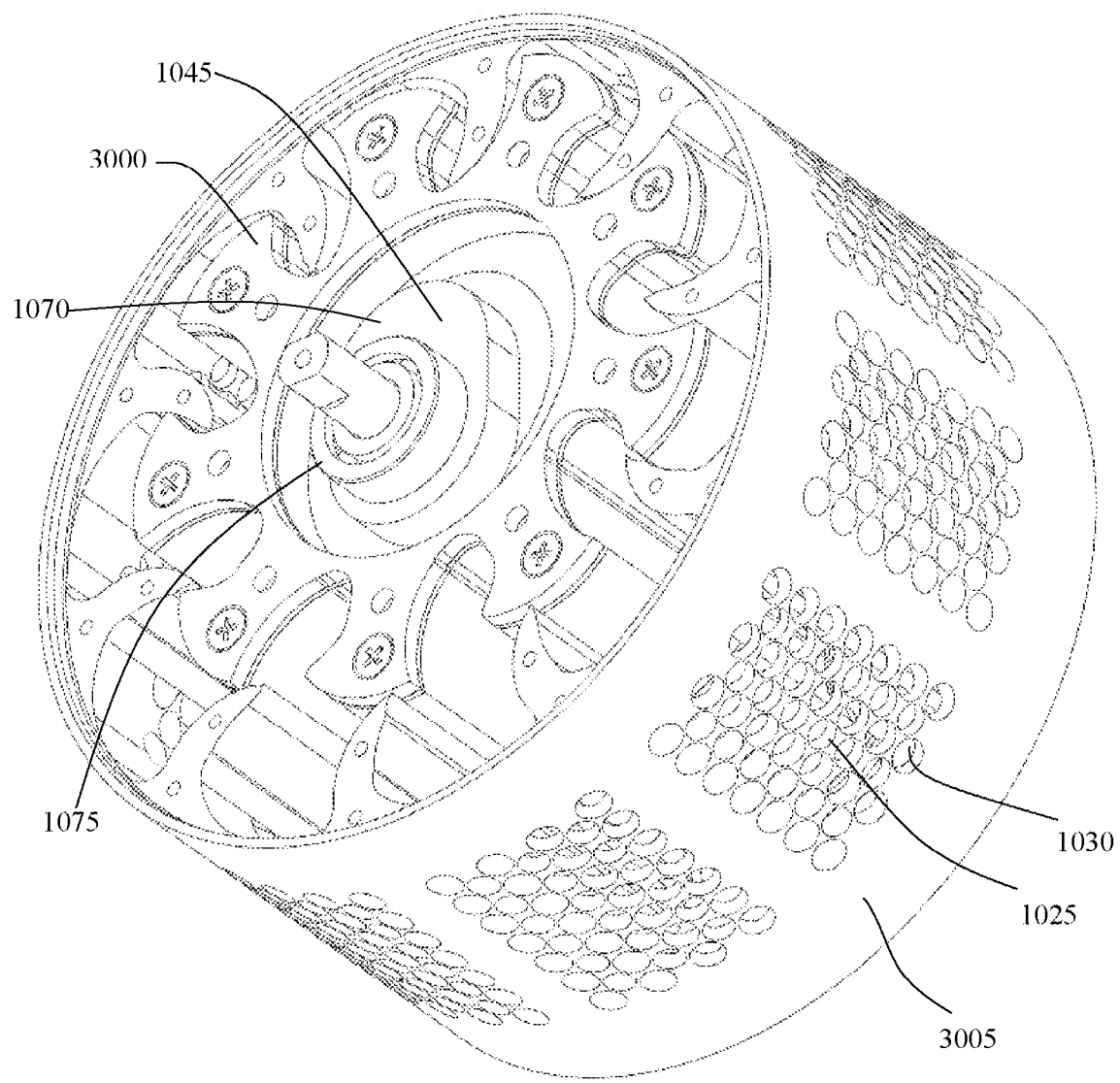
FIG. 3 is an isometric view of selected components of the exemplary energy transfer machine of FIG. 1, including inner and outer rotors of an internal gear pump of the exemplary energy transfer machine and an eccentric shaft on which the inner rotor is mounted for rotation.

An internal gear energy transfer machine is shown for example in FIGS. 1 and 2. An energy transfer machine 2000 may for example comprise a housing 2090 and an outer rotor 3005 having radially inward-facing projections 2010. The energy transfer machine also has an inner rotor 3000 having outward-facing projections 2015 configured to mesh with the radially inward-facing projections 2010 of the outer rotor. The inward-facing projections of the outer rotor at least in part define variable volume chambers 1020 between the inward-facing projections of the outer rotor. The inward-facing projections of the outer rotor and the outward-facing projections of the inner rotor intermesh at a Top Dead Center (TDC) portion of the internal gear energy transfer machine. An internal gear energy transfer machine as described in this paragraph may be used for example as a pump or hydraulic motor for pumping or being driven by a fluid, including for example a compressor or expander for pumping or being driven by a gas.

In certain embodiments including the embodiment shown in FIGS. 1 and 2, the outer rotor 3005 may be mounted on one or more outer rotor bearings 1054 for rotation relative to the housing about a first axis 1010 defined by the one or more outer rotor bearings. In the same or other embodiments, including the embodiment shown in FIGS. 1 and 2, the inner rotor 3000 may be mounted on one or more inner rotor bearings 1050 for rotation relative to the housing about a second axis 1015 defined by the one or more inner rotor bearings. In this document, a bearing of the one or more outer rotor bearings may be referred to as a "first bearing", and a bearing of the one or more inner rotor bearings may be referred to as a "second bearing", without excluding the existence of one or more further outer rotor bearings and/or one or more further inner rotor bearings.

In some embodiments of the internal gear energy transfer machine, including the embodiment shown in FIGS. 1 and 2, a support element 1045 may pass through an inner diameter of the first bearing. The internal gear energy transfer machine may have an electric motor or generator to drive or be driven by the internal gear pump or motor, including where the pump or motor is a compressor or expander, with the electric motor or generator 1049 including a stator 1041 mounted on the support element 1045 and a motor rotor 1039 mounted to the inner rotor. Some electric motors are capable of also operating as generators and vice versa and embodiments in which an internal gear energy transfer machine may operate as a pump or expander with an electric motor and also as a hydraulic motor or expander with a generator are contemplated. The support element 1045 may contain wiring (not shown, but which may extend for example through wire channel 2105 shown in FIG. 16), to power or receive power from the electric motor or generator 1049. The support element 1045 may also define a cooling channel for supplying a coolant to the electric motor or generator, for example as further described in relation to FIGS. 16 and 17 below.

The support element, if present, may take various shapes, and may be an integral part of the housing, fixed to the housing, or movable with respect to the housing and the inner rotor. A support element must not be fixed or integral to the inner rotor, but need not necessarily be fixed or integral to the housing, in order to support a stator which moves relative to an electric motor or generator rotor fixed to the inner rotor. Whether or not a support element supports a stator, it may support bearings on which the inner rotor is mounted.

Figure 17:
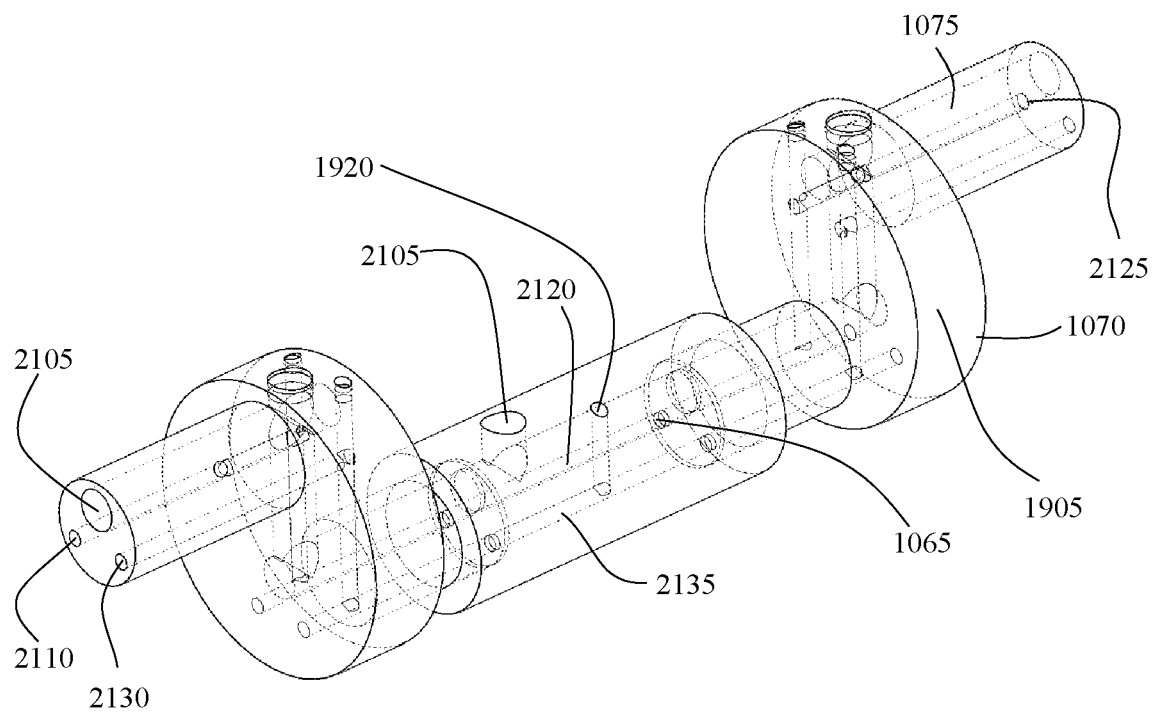
FIG. 17 is a partially transparent view of the eccentric shaft of FIG. 16 showing internal details.
Figure 18:
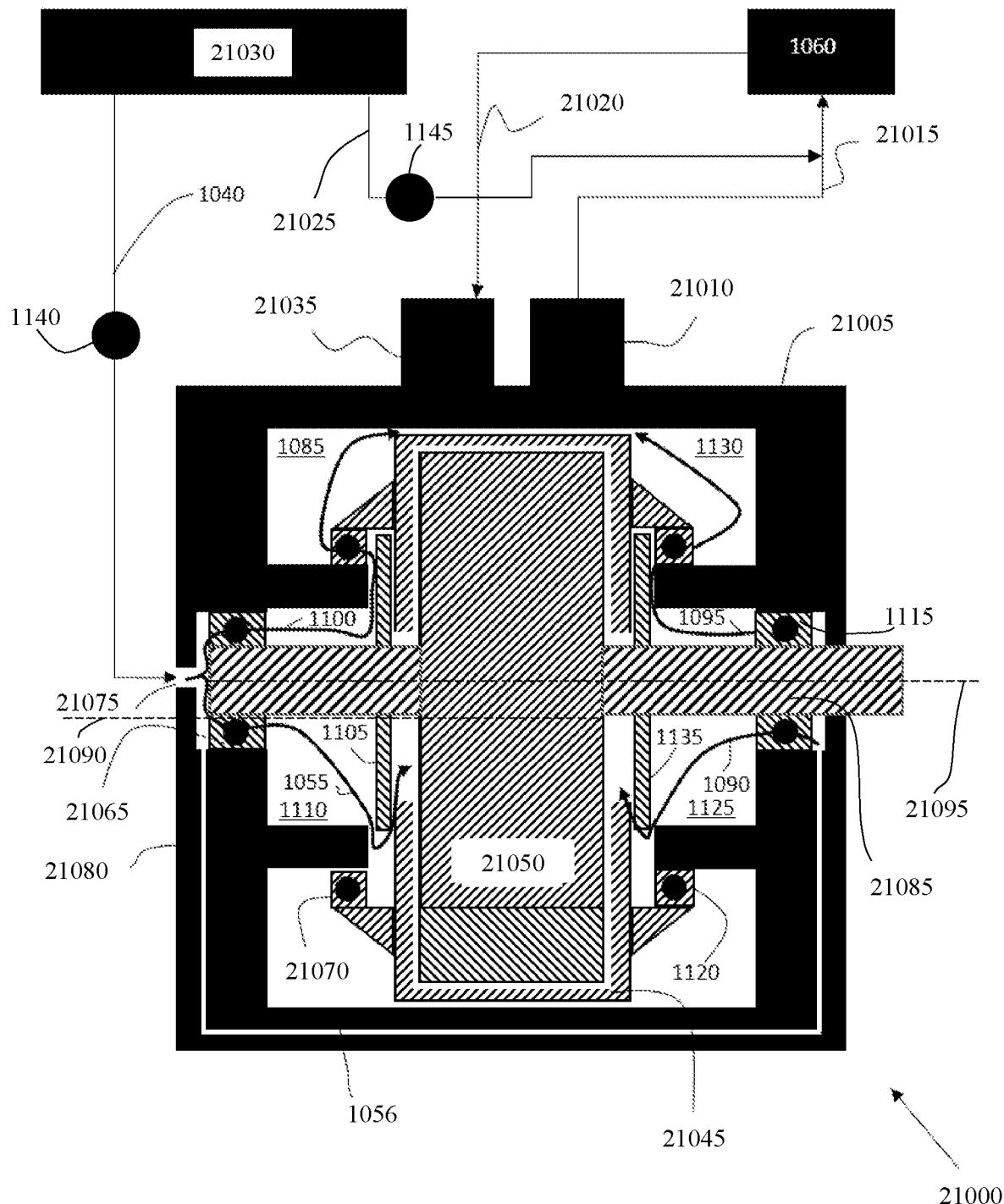
FIG. 18 is a schematic side cross section view of a further exemplary energy transfer machine including an arrangement for dry hydrogen flow through seals to protect portions of the machine from a corrosive working fluid.
Figure 19:
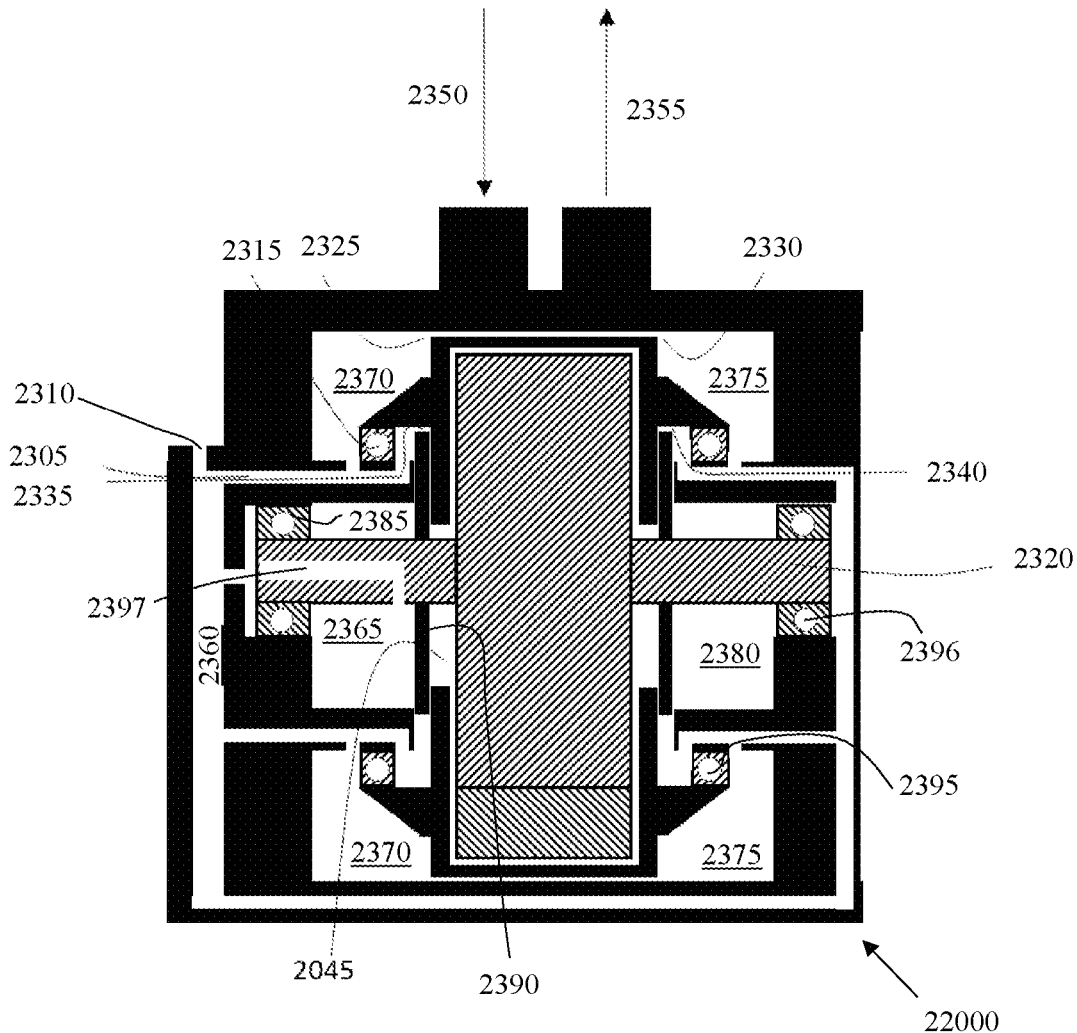
FIG. 19 is a schematic side cross section view of a further exemplary energy transfer machine including channels for dry hydrogen flow to protect portions of the machine from a corrosive working fluid.
Figure 26:
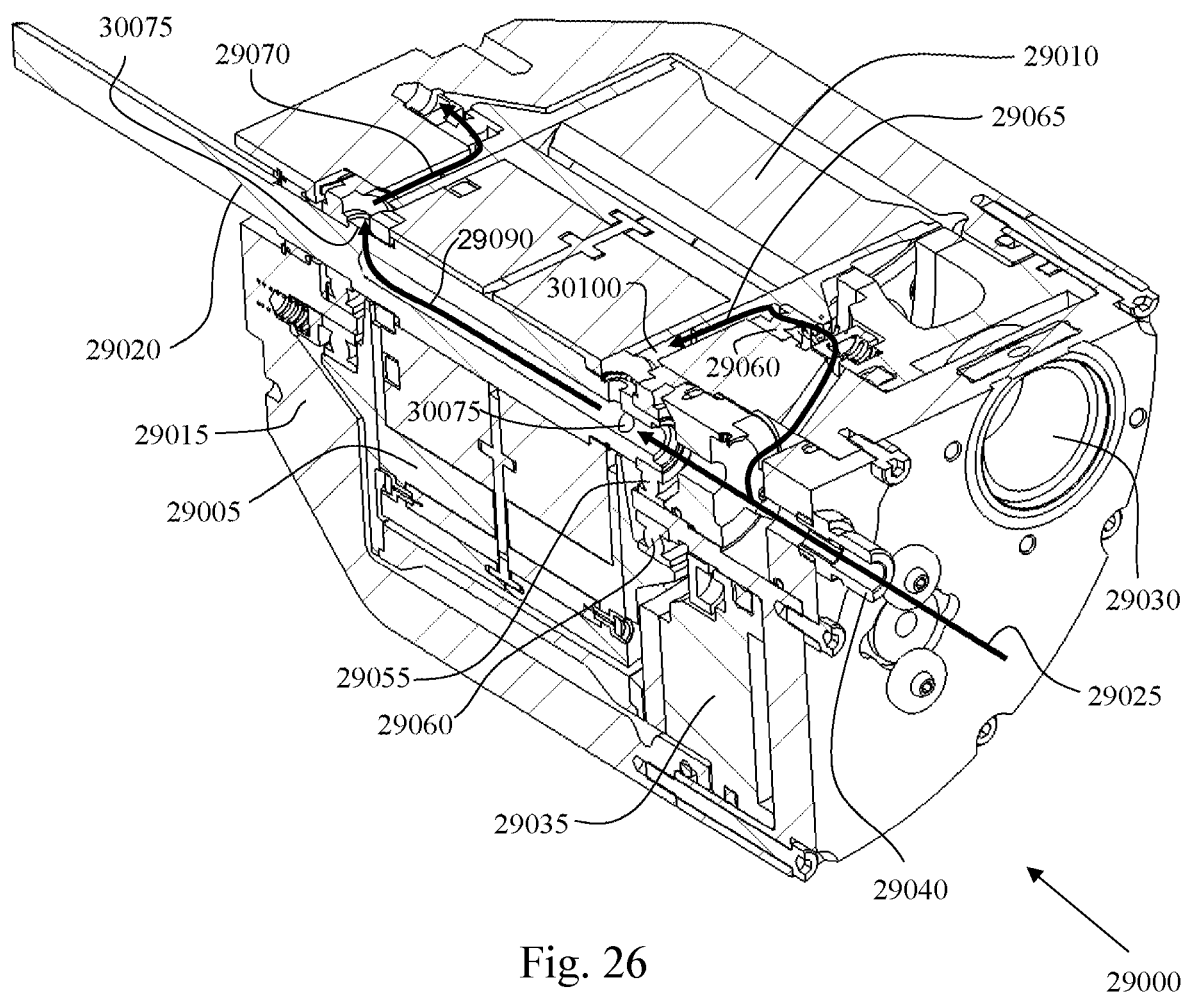
FIG. 26 is an isometric cutaway view of a further exemplary energy transfer machine with a bearing flushing arrangement.
Figure 27:
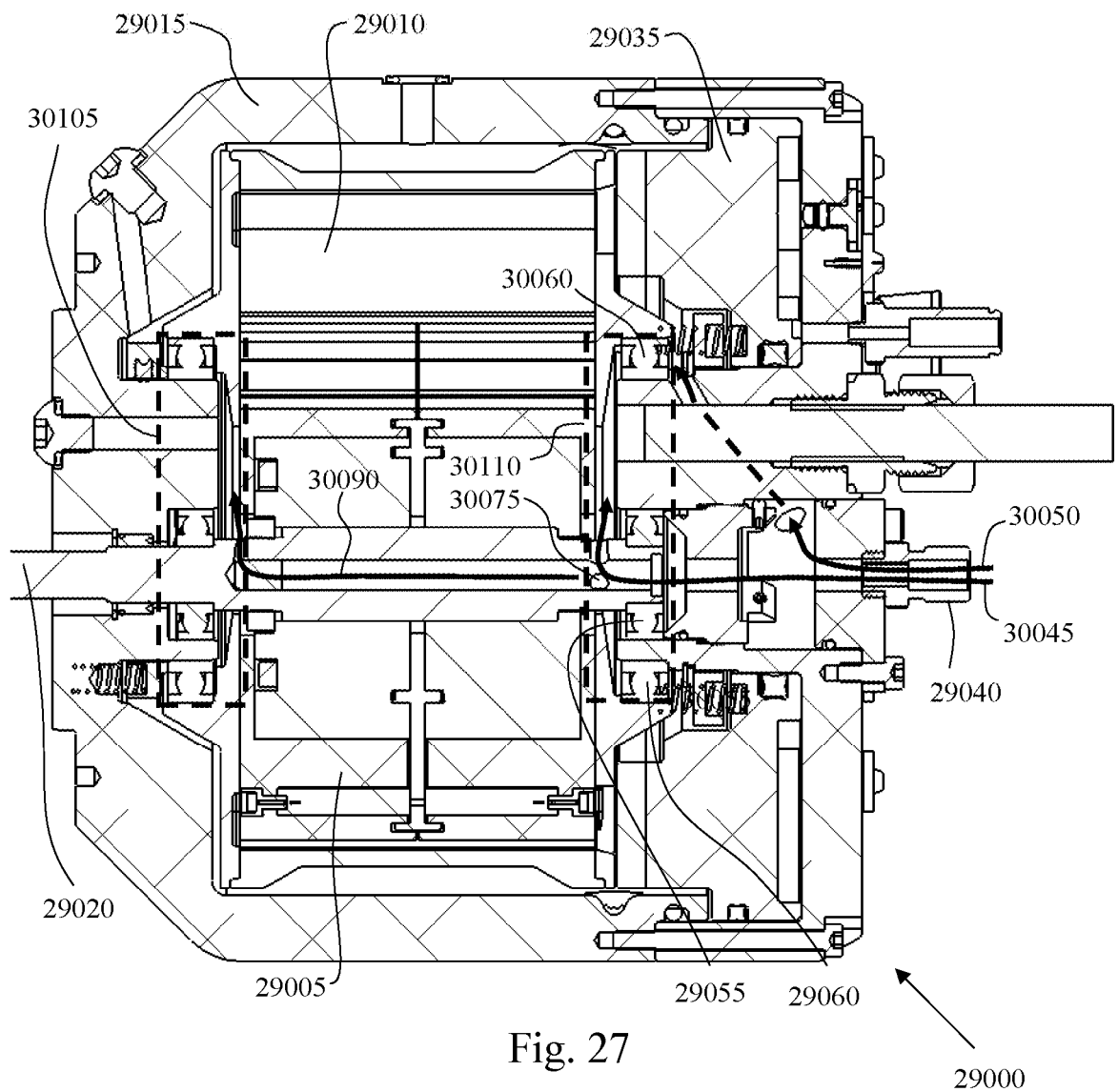
FIG. 27 is a side cross section view of the exemplary energy transfer machine of FIG. 26.

In some embodiments, for example as shown in FIGS. 18 and 19 and in FIGS. 26-27, the inner rotor may include an axle passing through the bearings supporting the outer rotor, and mounted on the inner rotor bearings. Alternatively, but not shown, a straight shaft, for example fixed to the housing, may be used as a support element substantially in the place where the axle is shown in these figures, that is passing through the outer rotor bearing (including the first bearing) offset from the outer rotor axis (first axis), and being substantially straight along the inner rotor axis (second axis), and the bearings mounting the inner rotor (including the second bearing) may be supported by this straight shaft. In some other embodiments, for example as shown in FIGS. 1-3 and 15-17, the support element comprises a shaft 1045 or 1905 connected to the housing which in these embodiments has a second axis portion 1065, and a transverse portion 1070 connecting the second axis portion directly or indirectly to the housing interior to the first bearing. In the particular embodiments shown, the transverse portion connects to a first axis portion 1075 that passes through the first bearing to connect the second axis portion to the housing. In the embodiments shown, the shaft is mounted to the housing at a first end 1080 and a second end 1081. In other embodiments (not shown) the shaft may be a first shaft mounted to the housing at a first end, a second end being within the inner rotor, and a second shaft may be mounted to the housing axially opposite to the first shaft. Both the outer rotor and the inner rotor may have bearings at each axial end, such that for example the first shaft and second shaft both pass through respective outer rotor bearings and mount respective inner rotor bearings. In the embodiments shown in FIGS. 1 and 15, the inner rotor bearings and the outer rotor bearings are all mounted to the shaft. In the specific embodiments shown in FIGS. 1-3 and 15-17, the shaft is generally contemplated to be fixed to the housing, but it could also be rotatable relative to the housing, e.g. around the outer rotor axis, to orbit the inner rotor bearing(s) about the outer rotor axis.

Inner Rotor Motor

Figure 15:
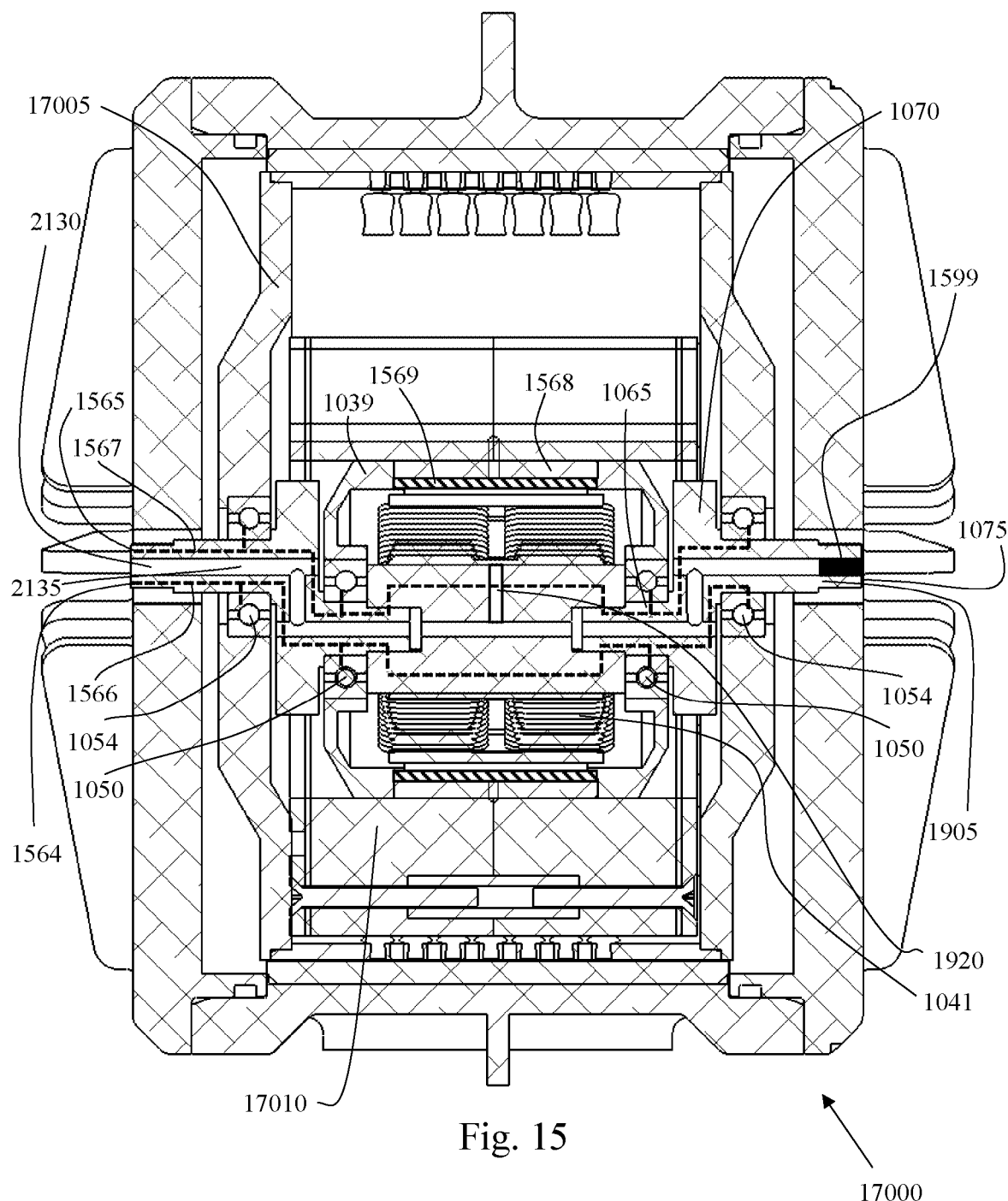
FIG. 15 is a side cutaway view of another exemplary energy transfer machine suitable for use as a hydrogen recirculation blower in a hydrogen fuel cell system for example as shown in FIG. 14.

In a non-limiting exemplary embodiment shown in FIG. 15, an energy transfer machine 17000 comprises, in part, an integrated electric machine having stator 1041 and rotor 1039 which is integrated into an inner rotor 17010, an outer rotor 17005, the inner and outer rotors configured to rotate about their respective axes which are parallel but not collinear, and an eccentric shaft 1905, having passages 2135. In this non-limiting embodiment aforementioned electric machine has a rotor 1039 comprising back-iron 1568 formed from a soft magnetic material such as but not limited to steel and an arrayed plurality of permanent magnets 1569. The inventor anticipates that alternate motor configurations could be used as well. As shown in FIGS. 15, and 17, passages 2135 are located within the eccentric shaft 1905. Inlet port 2130 leads to passage 2135. Passages 2135 provide an additional route from the exterior of the device to the interior of the device, along which fluids or wires may be routed. In a non-limiting embodiment, inlet port 2130 allows for the introduction of water into the aforementioned passages, for example from a water separator. Such channels may be formed during the manufacturing process by casting, by drilling and plugging the eccentric shaft, or by other methods known to those of ordinary skill in the art.

In a non-limiting embodiment shown for example in FIG. 1, an electric motor 1049 is located within the inner diameter of the inner rotor 3000. The inner diameter of the inner rotor 3000 may be connected to or integrally part of the rotor 1039 of the motor 1049. In the non-limiting embodiment shown in FIG. 1, the inner diameter of the inner rotor 3000 features permanent magnets 1035 which are located on rotor 1039 of motor 1049.

In the non-limiting example shown in FIG. 1, eccentric shaft components 1045 and 1046 hold the stator 1041 of the electric motor 1049 in a predetermined position, wherein the axis of the electric motor is parallel to and concentric to that of the inner rotor 3000 and parallel but eccentric to that of the outer rotor 3005 while also providing support for the inner rotor bearings 1050 and outer rotor bearings 1054. In this non-limiting embodiment, the eccentric shaft is comprised of multiple parts to aid assembly of the eccentric shafts with a pre-assembled motor stator, but it would be conceivable to use a single-part eccentric shaft wherein the motor stator is assembled around the eccentric shaft. The usage of an eccentric shaft to locate the inner rotor avoids the need for large diameter bearings for the outer rotor which would be necessary to accommodate a through-shaft for the inner rotor shaft within the inner diameter of the outer rotor bearing. For example, in the nonlimiting embodiments shown in FIG. 18 and FIG. 27, the inner diameter of the outer rotor bearings 21070 and 1120 in FIG. 18 and outer rotor bearings 30060 in FIG. 27 need to be of large enough diameter to accommodate the outer diameter of shaft 21085 of the inner rotor 21050 in FIG. 18 and shaft 29020 in FIG. 27 which are offset from the axis of the outer rotor, thereby requiring the inner diameters of the outer rotor bearings to be at least the diameter of the inner rotor shaft (at the point where it is in line with the outer rotor bearing) plus two times the distance between the axis of the inner rotor 21095 and the axis of the outer rotor 21090. That is:

Minimum Outer Rotor Bearing Inner Diameter =

Inner Rotor Shaft Diameter +

2x Offset Between Inner rotor Axis and Outer Rotor Axis

Conversely, when an eccentric shaft is used, the minimum inner diameter of the outer rotor bearing is not affected by the diameter of the inner rotor shaft or offset, allow for the potential to use smaller, lighter, and less expensive bearings.

Eccentric Shaft

Figure 16:
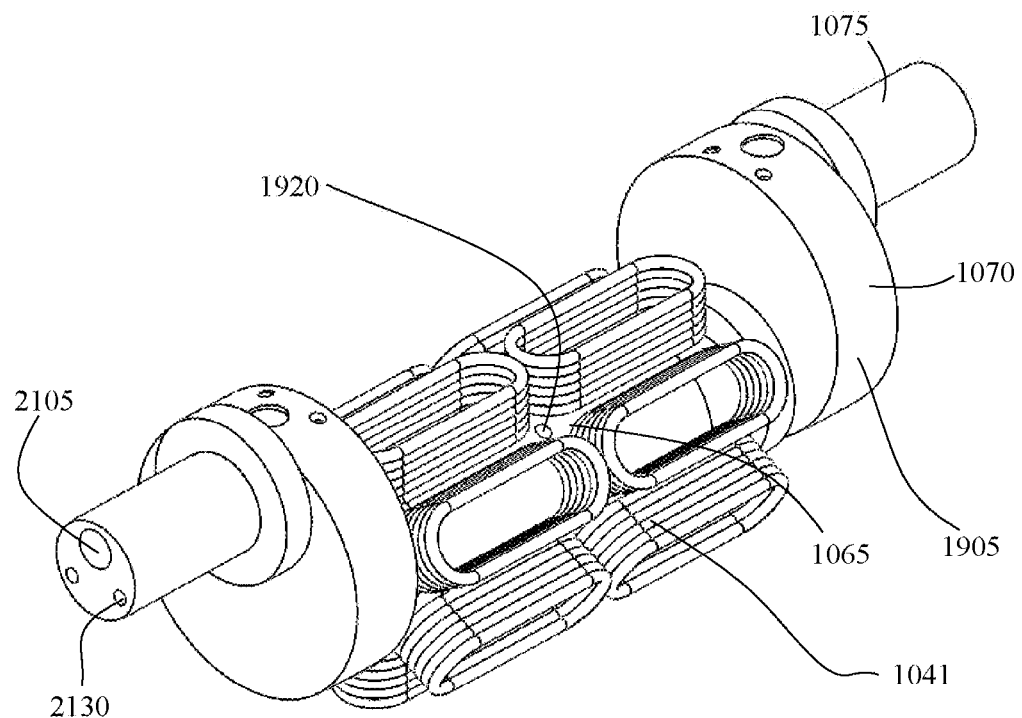
FIG. 16 is an isometric view of an eccentric shaft and attached electric motor stator coils for an energy transfer machine for example as shown in FIG. 1.

The eccentric shaft 1905 shown in FIG. 16, or any other support element described in this document for supporting a stator of an electric motor or generator in the inner rotor or for supporting the bearings of the inner rotor, may, include channels 2135 (shown in FIG. 17) discussed above and may also feature additional channels, such as channels 2105 which provide a path for routing of additional fluids or wires. Where a support element supports the stator of an electric motor or generator, the support element may include wiring to power or receive power from the electric motor or generator. For example, in the embodiment of FIG. 16 channels 2105 allow for routing of wires from the motor stator 1041 to the power source of the motor 1049 or routing of wires to sensors or other appropriate components. The motor stator 1041 may have stator wire windings made from appropriate hydrogen-compatible material. In a non-limiting embodiment, the stator wire windings are made from hydrogen-compatible Aluminum wire. Alternatively, a copper wire with a suitable coating such as but not limited to polyetheretherketone (PEEK) material may be used.

Where a support element supports the stator of an electric motor or generator, the support element may define a cooling channel for supplying a coolant to the electric motor or generator. In the non-limiting embodiment shown in FIG. 16, the eccentric shaft 1905 may feature an additional channel or channels, such as channel 2135 (shown in FIG. 17), which may allow for routing motor cooling fluid to the motor. In a preferred embodiment an ethylene glycol mix coolant is routed through channels 2120 to cool the motor stator 1041.

Additionally, a non limiting embodiment of the disclosed device may feature a channel or channels 1567 and 1566 for routing lubricant to bearings in the device as shown in FIG. 15. In the non-limiting embodiment shown in FIG. 15, bearing lubricant channel network 1567 has inlet port 1565 and supplies lubricant such as but not limited to grease to outer rotor bearings 1054 and inner rotor bearings 1050. Bearing lubricant return channel network 1566 provides a return path for excess grease to flow out of machine 17000 via lubricant discharge port 1564. As with other channels within a support element, for example an eccentric shaft, described in this disclosure, these channels may exist in addition to or independently of other channels within the eccentric shaft.

A non-limiting embodiment of an eccentric shaft having multiple channels, in which the channels are formed by drilling and plugging the eccentric shaft is shown in FIG. 17, where the bearings and motor windings are removed for clarity and where the channels are denoted by dashed lines.

In a non-limiting embodiment, the eccentric shaft may be rotated so as to adjust the timing of when the chambers seal and unseal. In an embodiment the eccentric shaft may be rotated so as to adjust the port timing and compression ratio of the machine at any time, including, but not limited to while the device is in operation.

Fluid Injection

In conventional PEM fuel cells, a concentration gradient causes water to diffuse from the cathode side of the stack to the anode side of the stack and thereby enter the anode-side loop. Designers often choose to employ a water separator to remove this accumulated water from the anode loop and/or a hydrogen recirculation blower (HRB) if one is employed. The inventor proposes an HRB device which repurposes water that accumulates in the anode loop by injecting the water into pre-determined regions of the machine in order to improve the lubrication, cooling, or sealing of components of the hydrogen recirculation blower (HRB) or to gain any combination of these benefits. For the purposes of this disclosure the term injected fluid refers to the fluid injected into pre-determined regions of the machine for these aforementioned benefits. In the non-limiting embodiments disclosed herein, the injected fluid is water, but the inventor contemplates that in other non-HRB applications other fluids such as but not limited to for example, a water/ethylene glycol mix, grease, or oil could be used as an injected fluid instead. This fluid injection system may be used with many different types of compressors or devices including, but not limited to, the embodiments described in this disclosure. Embodiments of the machine described here are well-suited to the use of the disclosed fluid injection system because of the large surface area of contact between the two rotors which provides a large hydrodynamic bearing surface area to prevent contact between an inner rotor and an outer rotor when injected fluid is introduced into this contact zone. In addition to decreasing wear, the introduction of injected fluid may improve sealing in certain areas, for example in the sealing areas between the outer rotor and the housing, and between the areas in sealing contact between the inner and outer rotor, especially when the pumped/compressed working fluid is of lower density than the injected fluid. Furthermore, the injected fluid may provide cooling to the device by carrying heat away from key areas of the machine. The layout of a non-limiting embodiment of a system utilizing this water separation and injection method is shown in the schematic drawing shown in FIG. 14 and a non-limiting example of the geometry of an energy transfer machine which may be used in such a system is shown in FIG. 15 and further described below.

System Layout

In a non-limiting embodiment, an apparatus may include a fuel cell, and an internal gear pump compressor configured as a Hydrogen Recirculation Blower (HRB) for the fuel cell. A fluid may be injected into the HRB. The injected fluid may be water which has been collected from the anode loop of a fuel cell and separated by a water separator. It is understood that the term injected fluid is a generic term for the fluid which may be used for purposes including but not limited to cooling, lubrication, sealing, or any combination of these purposes. Other fluids may be injected, and fluids may be injected into other internal gear pumps, internal gear compressors, internal gear expanders and internal gear hydraulic motors than an internal gear compressor configured as an HRB.

Figure 14:
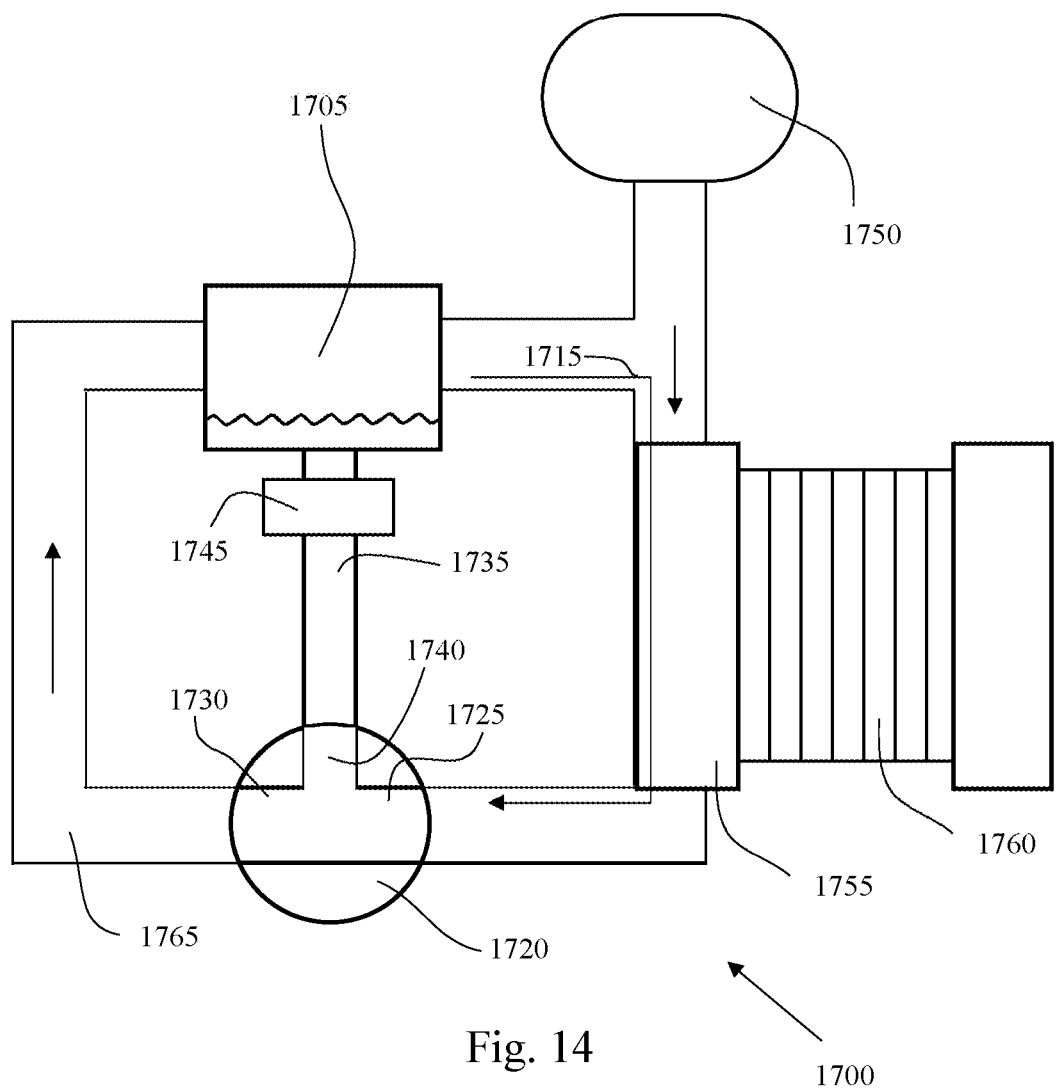
FIG. 14 is a schematic diagram of an exemplary hydrogen fuel cell system including a hydrogen recirculation blower which may be an energy transfer machine for example as shown in FIG. 1.

As depicted in the non-limiting embodiment shown in FIG. 14, water collected from a water separator 1705 in the anode loop 1765 of a fuel cell is used as the injected fluid. The anode side of fuel cell 1760 is indicated by line 1755. Line 1715 depicts a route of (de-watered) gasses in the anode loop. The de-watered hydrogen reacts with oxygen as it passes through the anode side of the fuel cell stack 1755 to produce electricity. Fresh dry hydrogen from storage tank 1750 may be introduced into the anode loop 1765 as the hydrogen reacts with oxygen in the fuel cell stack 1755. The water separated by separator 1705 may be supplied to the inlet port 2130 of the injected fluid channels in an eccentric shaft 1905 as shown in FIG. 15; the water formed from the reaction of hydrogen and oxygen in the fuel cell stack may be delivered to the inlet port 2130 via the system 1700 depicted in the non-limiting embodiment shown in FIG. 14 wherein line 1735 depicts the route of water flow from the water separator to an inlet port 1740 of the device 1720. For reference, the outlet port of the HRB is shown by character 1730 in FIG. 14, and a main (hydrogen-containing working fluid) inlet is indicated with reference numeral 1725. In such an embodiment, the flow of water along line 1735 from the water separator 1705 to the device 1720 may be driven by the difference in pressure seen by the water separator and the pressure that is seen by the distribution channels in the device. That is, whereas the water separator 1705, positioned on the outlet side of the device, always sees a pressure roughly equivalent to the outlet pressure of the device, distribution channels (for example channel 28025, shown in FIG. 25) in the device are intermittently exposed to both inlet and outlet pressures. This intermittent exposure to lower pressures may provide the pressure differential needed to drive injected fluid from the water separator 1705 along line 1735 and into the device 1720.

Figure 25:
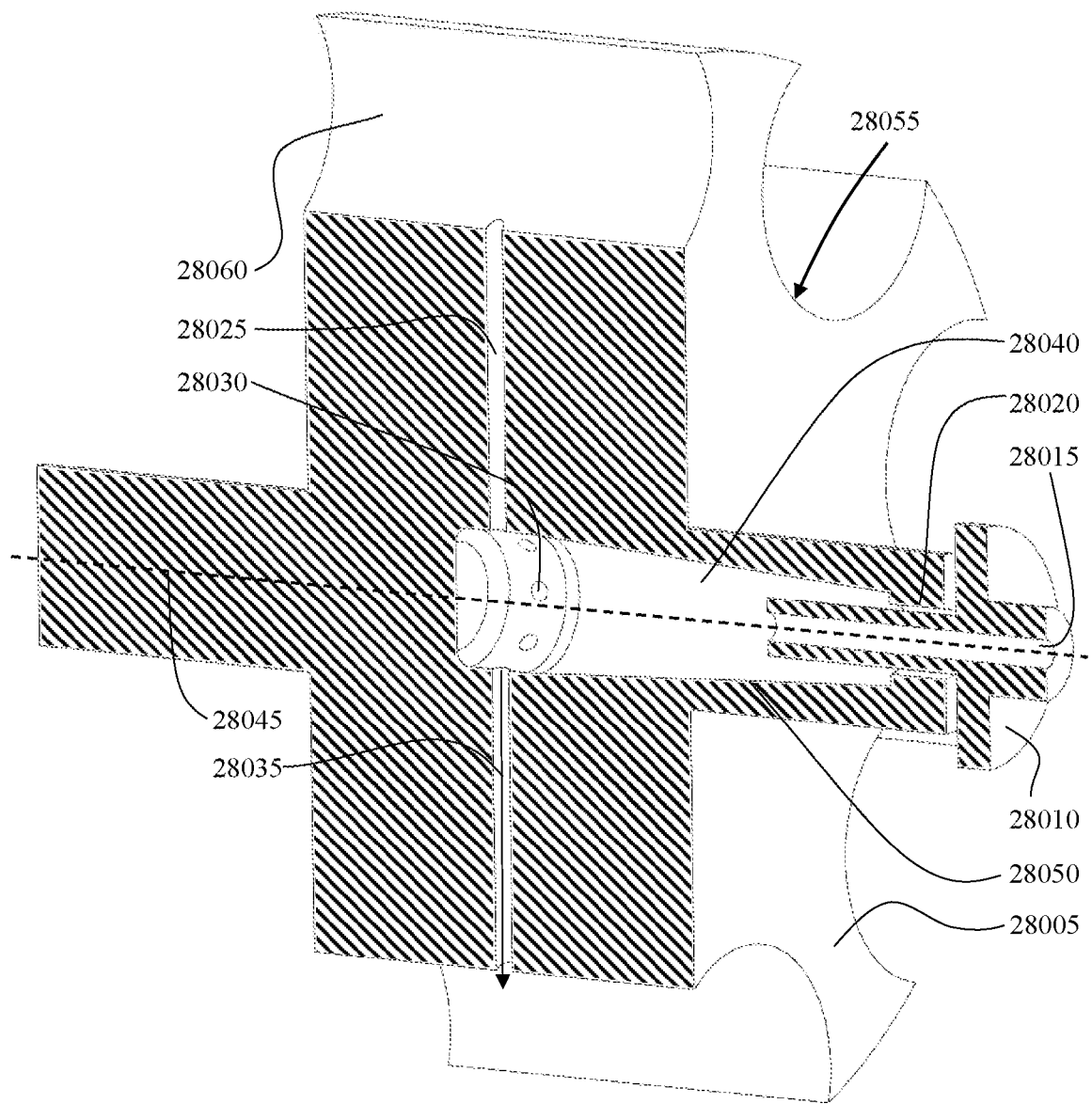
FIG. 25 is a side cutaway view of an inner rotor of an energy transfer machine using centrifugal force to supply a fluid within the device for example for lubrication.

Additionally, the inventor contemplates that fluid flow along line 1735, shown in FIG. 14 may be driven by the pressure differential caused by a column of fluid within rotating injected fluid distribution channels, such as channel 28025 shown in FIG. 25, experiencing centripetal acceleration. For example, upon device start-up, injected fluid within a single fluid distribution channel such as fluid channel 28025 (shown in FIG. 25) located in the inner rotor within the device may begin to move radially outwards, relative to the rotor axis which houses the injected fluid passageway. This movement may in turn create low pressure within portions of the distribution channels relative to the pressure seen by the water separator, similar to the operational principle of a centrifugal pump. Thus, a pressure differential is created and fluid may flow along line 1735.

Additionally, the inventor contemplates that, as shown in the non-limiting embodiment shown in FIG. 14, positioning of the water separator 1705 vertically above the device 1720 may result in flow from the separator to the injected fluid inlet of the device along line 1735 as a result of gravitational force. During shutdown conditions, inclusion of a valve along line 1735 may be used to prevent draining of the water separator into the device while the fuel cell stack is not operational. In applications in which the device is subjected to low temperatures, it may be undesirable for water to pool in the device chambers because ice may form which could impede rotation of the rotors during start-up. Also, if fluid is used for cooling of the stator or lubrication, the inventor anticipates that certain injected fluids could also freeze in low temperature conditions. In these cases, in which operating conditions could result in ice formation, a purge valve could be used to drain pooling of fluid from the device. Alternatively, in some non-limiting embodiments for certain applications the injected fluid may reside in a closed loop circuit and, in non-fuel cell applications, the injected fluid may contain additives such as but not limited to ethylene glycol which would lower the freezing point of the injected fluid.

The capacity of the accumulator reservoir used to contain injected fluid, which is water in the embodiment shown in FIG. 14, may be much larger than in a typical fuel cell where this volume is intentionally minimized. In the case of the present device, a larger volume of water may be continually circulated to provide a high volume of water for cooling and wear reduction in the device, as long as an adequate amount of this water is separated out of the gas flow before the significantly dry gas enters the fuel cell stack.

The non-limiting embodiment of an energy transfer machine 17000 shown in FIG. 15 may be used, for example, as a hydrogen recirculation blower (compressor) in a hydrogen fuel cell system. In this non-limiting embodiment, the gas discharge from the compressor is directed through a water separation device, which may be of many types, including but not limited to, a centrifugal separator, to accumulate water from the gas flow into a reservoir. Water droplets that are entrained in the gas flowing through the compressor are separated out of the gas flow in this water separation device. In the non-limiting embodiment shown in FIG. 14, injected fluid is separated out by a fluid separator 1705 and optionally stored in an injected fluid reservoir 1745.

Injected fluid then flows from the reservoir to the compressor as a result of a pressure differential, a pump, gravity, centripetal acceleration of the water in a rotating component of the compressor, or any combination of these methods.

In embodiments that include a support element, for example supporting one or more inner rotor bearings and passing through an inner diameter of one or more outer rotor bearings, the support element may define a fluid injection channel for supplying the injected fluid to the inner rotor. In an example, injected fluid is introduced via the injected fluid inlet port 2130 shown in FIG. 15. It may then flow through one or a plurality of water distribution channels 2135 in an eccentric shaft 1905 and via ports 1920 which are positioned between two halves of the electric machine stator 1041, and through rotating plenums in an inner rotor 17010 respectively. In some embodiments, the fluid injection channel is connected to an inner plenum of the inner rotor to supply the injected fluid through further channels in the inner rotor, the further channels connecting to a radially outer perimeter of the inner rotor. Such an embodiment is shown in FIG. 25. In the non-limiting embodiment shown in FIG. 25, a simplified inner rotor 28005 is shown for reference with imaginary line 28045 showing the aforementioned inner rotor's axis of rotation. The fluid injection channel may be connected to the inner plenum of the inner rotor via a rotary connection. Water, used as an injected fluid in this non-limiting embodiment, is supplied from a channel 28015 located inside a fixed water injector nozzle 28010, which extends into the inner diameter of plenum 28040 located within the inner rotor 28005. When the inner rotor rotates it supplies water to channels 28025 via centripetal acceleration, the water flowing in the radial direction showed for reference by arrow 28035. When the inner rotor rotates at sufficient speed, the sloped walls 28050 of the plenum cause water encountering the sloped plenum walls 28050 to travel in the direction of increasing plenum wall diameter, thereby moving in the axial direction from the inlet 28015 to the end of the plenum 28040 which features inlets 28030 of water channels 28025 located in the inner rotor 28005. Because water exiting stationary water channel 28015 moves axially towards the opposite end of the plenum, a contacting seal may not be necessary between the rotating plenum and the stationary water injector nozzle 28010. In an embodiment, the inventor contemplates that stationary injector 28010 may form a proximity seal with inner rotor 28005 at neck 28020 of inner rotor 28005. Alternatively, the inventor contemplates that conventional seals may be used to prevent leakage of the water from the rotating plenum around the stationary injector. The water flowing to the end of the plenum ends up flowing towards largely radial water channels 28025 which supply the injected fluid to a radially outer perimeter of the inner rotor, in this case to the troughs 28055 of the inner rotor lobes 28060. In the non-limiting embodiment shown in FIG. 15, plug 1599 seals the end of channel 2135. This enables both eccentric shafts to have the same geometry for ease of manufacturing.

The same structures described as carrying the injected fluid here, for example ports 1920, may also be used to carry other fluids such as hydrogen, as further described below.

When such injected fluid plenums are employed, motor cooling injected fluid supplied to the inlet port 2130 may be dispersed into the device from these motor cooling injected fluid distribution channels. The injected fluid channels may be designed such that the distribution points include the roots of the inner rotor lobes where injected fluid flow will be directed toward the surface of the inner and outer rotors where sliding contact is used to time the rotation of the outer rotor relative to the inner rotor, or other points where sliding or sealing happen. Deployment of injected fluid to these points may result in the formation of fluid films between components to reduce heat generation and wear of, and otherwise prevent degradation of sliding contact surfaces in the device. Similarly, the presence of fluid may augment the sealing performance of the device, resulting in improved device efficiencies.

Figure 11:
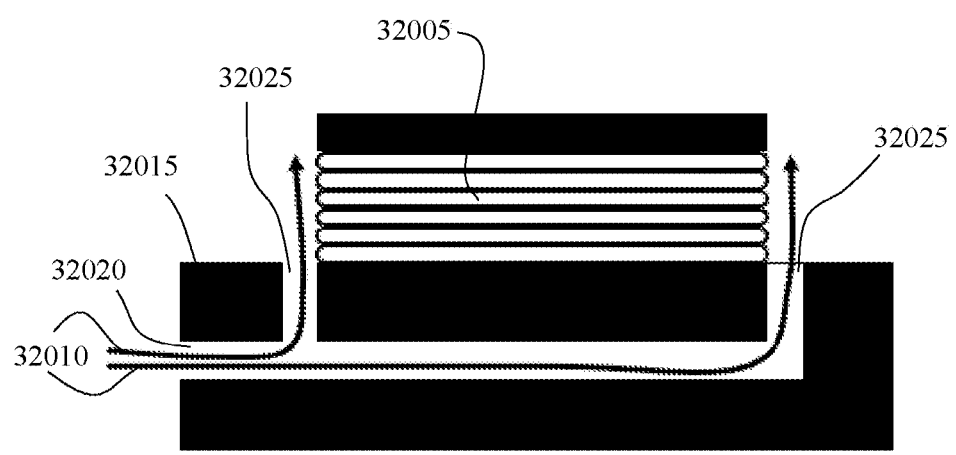
FIG. 11 is a close-up schematic drawing of a motor stator's cooling channels.
Figure 12:
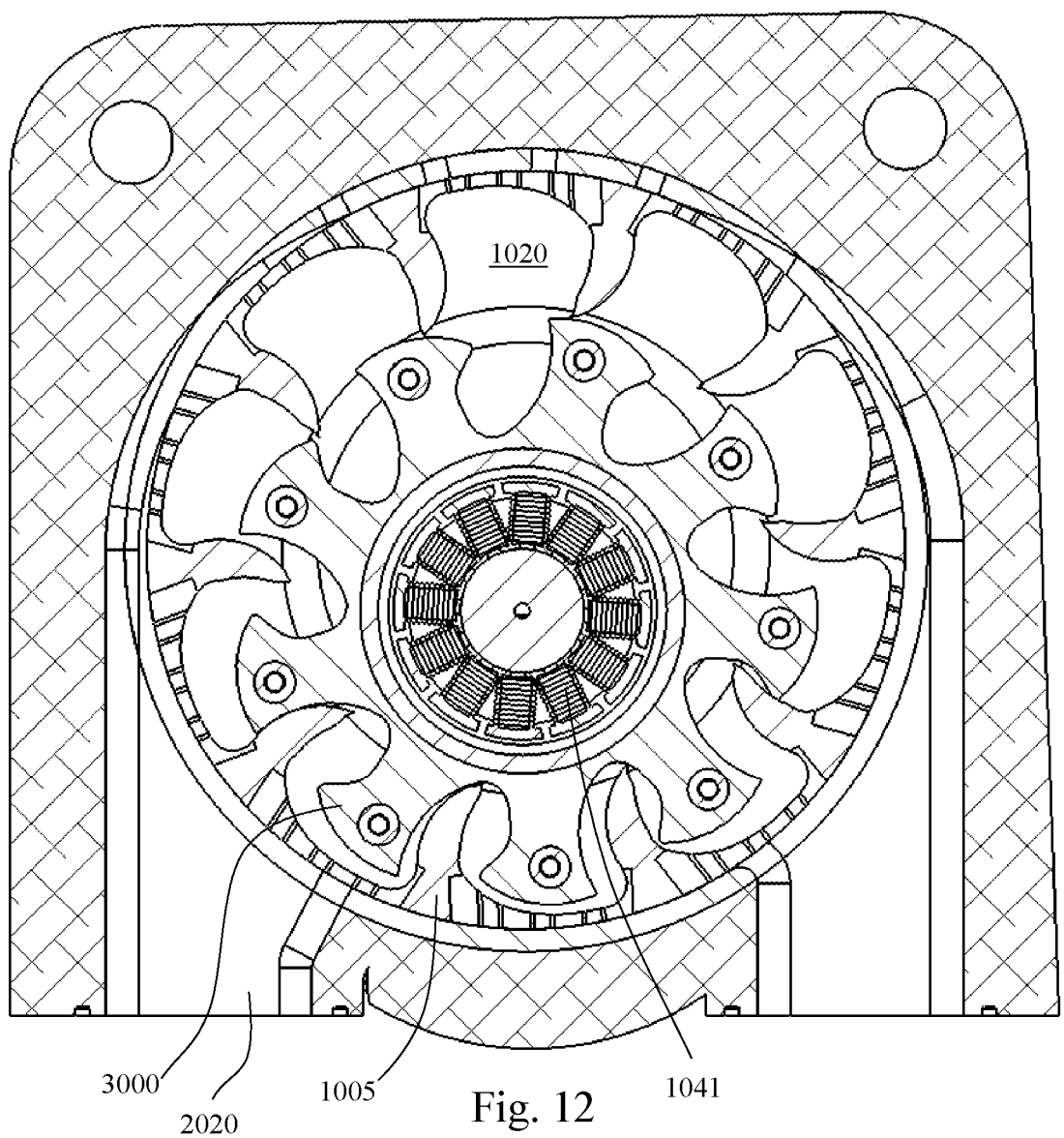
FIG. 12 is an axial cross section view of the exemplary energy transfer machine of FIG. 1.
Figure 13:
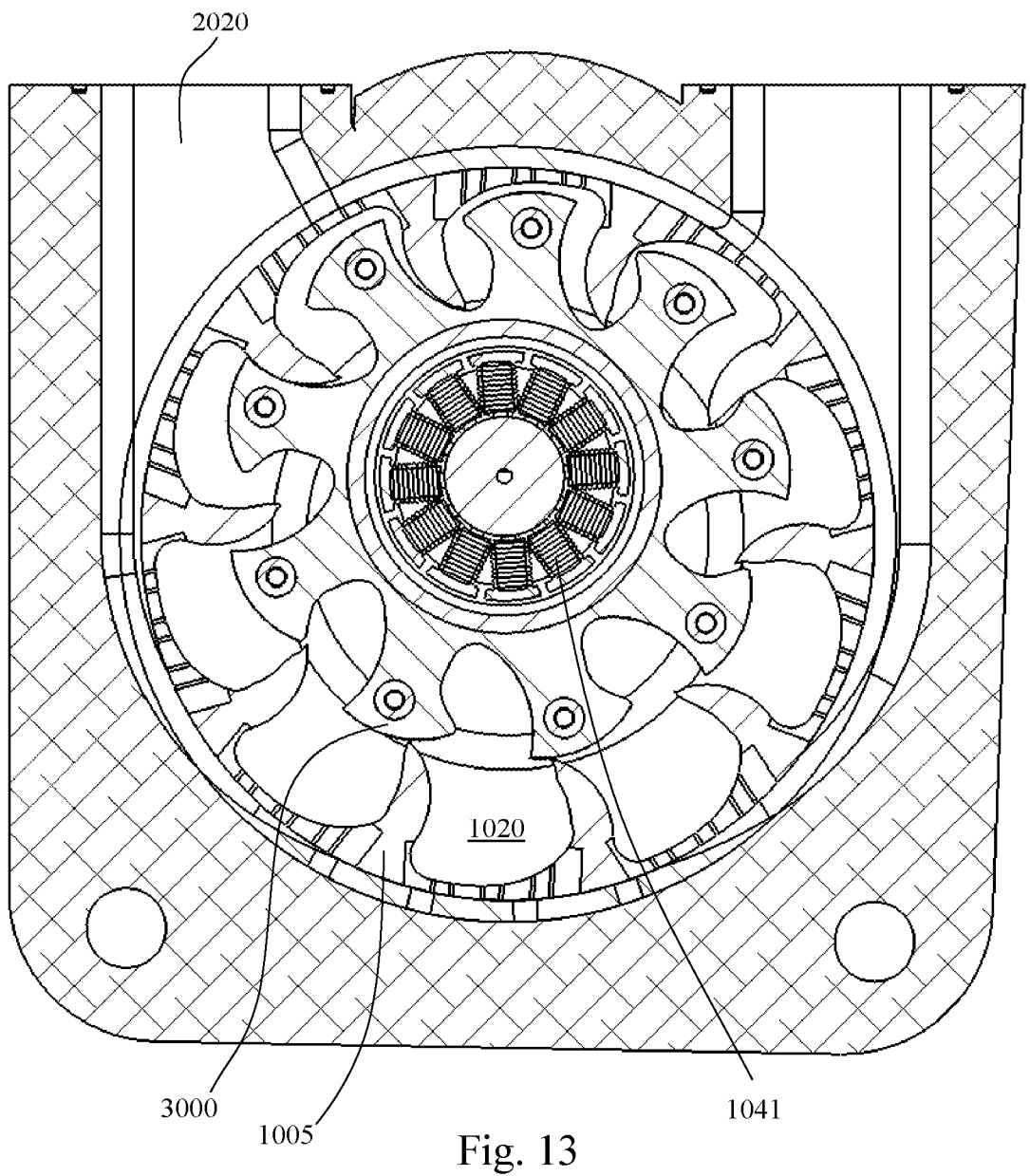
FIG. 13 is a further axial cross section view of the exemplary energy transfer machine of FIG. 1, seen from an opposite axial direction than FIG. 12.

The inventor contemplates embodiments in which the water is not routed through the center of the inner rotor or electric machine halves, but rather is routed offset from the center of such components, or is routed to one or both sides of a component which is not otherwise split by water passageways, or by a combination of these options. For example, a non-limiting embodiment is shown in the semi-schematic FIG. 11. A channel 32020 within the input shaft 32015 carries injected fluid around the stator 32005. Arrows 32010 show the path of the injected fluid as it travels through channel 32020, through ports 32025, and thereby around stator 32005. Additionally, the inventor contemplates that injected fluid passageways may be routed through a core of a winding or plurality of windings of an electric machine.

Additionally, the inventor contemplates that water channels may be routed axially through the inner rotor, in order to distribute fluid to one or both axial faces of the inner rotor, such that the same benefits may be achieved on the axial faces of the inner rotor. That is, routing of water to one or both of these axial faces may result in the formation of a fluid film between the axial face or faces and components which are in close proximity to these face or faces, resulting in the potential for reduced surface wear, reduced temperatures, and improved sealing, between these faces.

H2O and Bearing Longevity

Although designed introduction of injected fluids into the device may result in operational advantages described above, it may have a detrimental effect on the longevity of the device if the fluids used are corrosive to and are in contact with certain components of the device, in particular rotating components which include, but are not limited to bearings, which may be sensitive to the aforementioned injected fluids. Furthermore, even if fluid is not introduced by design by methods described herein, if the device is used in certain applications, it is possible that fluid would be present in the system. For example, when the disclosed device is used in a hydrogen recirculation blower application it is highly likely that moisture—a by-product of hydrogen fuel cells—would be present in the anode-side loop. Thus, a device used in an application with corrosion, gas embrittlement, rust, or similar fluid/material compatibility risks may require additional considerations, such as the positive pressure bearing flushing method disclosed herein, to achieve a desirable lifetime.

Bearing Flushing

In this disclosure, positive pressure refers to a pressure that is higher than that of the working fluid of the device. The inventor discloses a method, referred to in this disclosure as the positive pressure method, of fluid routing and a system design which subjects regions of a device having fluid-sensitive components or assemblies, these regions called bearing flushing regions, to a positive pressure environment filled with a less corrosive fluid. The positive pressure of the bearing flushing regions relative to surrounding areas containing corrosive fluids would reduce or eliminate ingress of corrosive or otherwise damaging fluid into the bearing flushing regions, thereby protecting fluid sensitive components or assemblies. Use of such a method or system design may result in longer component or assembly life and may enable geometries which would otherwise fail too quickly, to be viable. Bearing flushing may be combined with the separate introduction of other fluids or the same fluid for other purposes, such as for cooling an electric motor or generator or for lubrication. The same fluid may also be used serially, for example, the one or more bearing flushing channels receive the flushing fluid from the electric motor or generator, at least some of the flushing fluid received from the electric motor or generator having been supplied to the electric motor by a cooling channel.

In a device there may be first regions or volumes which contain fluid sensitive components or assemblies. These fluid sensitive components or assemblies could include, but are not limited to, bearings, components made of materials prone to corrosion, such as steel, or sensors. In such a device, there may also be second regions or volumes which contain first fluids known to cause corrosion or damage to fluid sensitive components or assemblies. In order to prevent these first fluids from contacting and corroding or otherwise damaging fluid sensitive components or assemblies, a seal may be provided between first and second sections or regions of the device. However, seals may be imperfect and allow for gradual leakage of the fluid from one section or region of the device to another. Seals may also cause too much friction and are prone to wear. To prevent this, the inventor proposes supplying the first region of the device with a second fluid, called a bearing flushing fluid, the pressure of which is sufficient to prevent or reduce flow of the first fluid into the first region of the device. Thus, in the absence of the supply of flushing fluid to the first region, a working fluid would ingress into the first region at a default rate, and the flushing fluid supplied to the first region is supplied to the first region at sufficient pressure to reduce ingress of the working fluid into the first region below a threshold lower than the default rate. Ingress into a region may be, for example, ingress into a bearing and thus into a region connected to the bearing. For the purposes of this application the bearing flushing fluid is a generic term for a fluid which may be used to protect components other than bearings. This bearing flushing fluid may be chosen to be of a makeup that does not cause corrosion or damage to the fluid-sensitive components or assemblies of a device. Fluids with such makeup may include but are not limited to air, hydrogen, or purified or filtered mixtures of the first fluid.

The bearing flushing fluid may also be a substance or composition present in the working fluid, regardless of whether the working fluid is filtered or purified to produce the bearing flushing fluid. An advantage for using a substance or composition present in the working fluid is avoidance of contamination of the working fluid with a foreign substance. For example, where a working fluid contains hydrogen, such as a working fluid comprising hydrogen and liquid or gaseous water, dry hydrogen may be used for flushing. In an example, a gear pump compressor is a hydrogen recirculation blower (HRB) in an anode loop for a fuel cell. Dry hydrogen may be obtained for example from a hydrogen tank. The dry hydrogen may be heated between the hydrogen tank and the HRB. The hydrogen may be heated in one embodiment at least in part by waste heat from the fuel cell. In another embodiment, the hydrogen may be heated at least in part by waste heat from the HRB itself, for example an electric motor of the HRB. This could be implemented by, for example, directing the hydrogen first as coolant to the HRB and then collecting the coolant for use as a flushing fluid.

Thus, the housing may include one or more bearing flushing channels for supplying a bearing flushing fluid to one or more bearings, for example via broad regions of the device or more direct supply via narrow channels. The one or more bearings may include one or more inner rotor bearings, one or more outer rotor bearings, or both inner and outer rotor bearings.

Where a device includes a support element supporting the stator of an electric motor or for supporting one or more inner rotor bearings, the support element may include an internal bearing flushing channel to supply the flushing fluid to the one or more inner rotor bearings or one or more outer rotor bearings or both. Different bearings may be supplied fluid by the same or different channels.

In embodiments where the flow rate of the first fluid across the fluid sensitive components or assemblies, as opposed to the chemical makeup of the first fluid, may be the cause for damage to said fluid sensitive components or assemblies, the bearing flushing fluid may be of the same chemical makeup as the first fluid and may be supplied in such pressures so as to reduce the flow of the first fluid. This may be applicable where, for example, a bearing or arrangement of bearings is lubricated with grease or oil, and high flow rates may more quickly remove this critical lubrication from the bearing or arrangement of bearings.

In a non-limiting embodiment, a bearing enclosed in a housing for a compressor, is subjected to positive gas pressure to prevent fluid being displaced by the compressor from flowing into the bearing-containing first regions or volumes.

Such a device, and a system in which it may be used is depicted in the non-limiting embodiment shown in FIG. 18, wherein a positive displacement rotary machine 21000 having an inner rotor 21050 and outer rotor 21045 is used to transfer a fluid that is corrosive to the inner rotor bearings 21065 and outer rotor bearings 21070 through the machine 21000. For simplicity, the semi-schematic FIG. 18 does not show a means of powering the device, such as an electric motor, but it would be simple for someone skilled in the art to modify such a device to include an electric motor connected to drive inner rotor axle 21085. It could also be modified to replace axle 21085 with a shaft, and move the inner rotor bearings to support the inner rotor on the shaft, so that the electric motor could drive the inner rotor relative to the shaft. In this non-limiting embodiment, the positive displacement rotary device acts as a hydrogen recirculation blower in a fuel cell application. As shown in the non-limiting exemplary embodiment shown in FIG. 18, dry hydrogen stored at high pressure in tank 21030 is routed from tank 21030 to a port 21075 in housing 21080, with flow controlled by valve 1140. Dry hydrogen flows from port 21075 around inner rotor bearing 21065, located in the housing 21080. A first portion of the dry hydrogen flows past the inner rotor bearing 21065 and follows the path shown by line 1100 which leads through and/or around bearing 21070 and into region 1085, the path then leading to the area indicated by the arrow on the end of line 1100, which is a sealing gap (which may be but is non-limited to a non-contacting seal and which may be but is not limited to a contacting seal) between the outer rotor 21045 and the housing 21080, thereby subjecting region 1085 to positive pressure relative to the relatively lower pressure of the working fluid flowing through machine 21000. In this non-limiting embodiment, wherein the machine 21000 is used in a fuel cell application, the working fluid is anode loop gas which contains, among other compounds, hydrogen, water (which may be deionized water), and water vapor formed within the anode loop. Sealing the bearings completely from this water and or water vapor by means of a contact seal, may result in undesirable friction and cause the seals to wear over an extended lifetime as discussed elsewhere in this disclosure. Embodiments of the invention disclosed here can be used to flush dry hydrogen from the fuel storage tank over the bearings, evacuating a portion of or all of the water and or humid hydrogen mix from around the bearings, or by preventing ingress of humid hydrogen mix in the first place via positive pressure to prevent the water from contacting the bearings for some or all the time. In this disclosure, the term "humid" indicates the presence of water in liquid or gaseous form and does not necessarily imply that the water is homogenously mixed within the gas. The term "dry" is used to indicate that a gas is not substantially humid but does not exclude the presence of small amounts of water. Other gases, for example nitrogen, may also be present in humid or dry hydrogen. The positive pressure indicated above prevents leakage, in the embodiment of FIG. 18, of the working fluid of machine 21000 into regions 1085 and 1110 which contain bearings 21065 and 21070. Similarly, a second portion of dry hydrogen traveling from tank 21030 follows the path indicated by arrow 1055 and travels past inner rotor bearing 21065 and potentially also past seal 1105. In a non-limiting embodiment seal 1105 may be a non-contacting seal for low resistance. In such a non-limiting example the device could be designed for minimal seal friction whereby a small amount of fluid in region 1110 (much lower flow rate than the working fluid) would leak past seal 1105. This leaked fluid would enter the internal chambers of machine 21000 and would join the working fluid of machine 21000, subsequently being discharged by discharge port 21010 and entering fuel cell stack 1060. A third portion of dry hydrogen traveling from tank 21030 travels through port 21075 into machine 21000, then through channel 1056 leading from port 21075 to inner rotor bearing 1115, the dry hydrogen then passing through and/or around bearing 1115. A fourth portion of dry hydrogen would travel along the path indicated by arrow 1095 which passes through and/or around outer rotor bearing 1120 the path leading to the area indicated by the end of arrow on the end of line 1095, which is a sealing gap between the outer rotor 21045 and the housing 21080, thereby subjecting region 1130 to positive pressure relative to the pressure of the working fluid flowing through machine 21000, thereby preventing or reducing flow of the working fluid of machine 21000 into regions 1130 and 1125 which contain bearings 1115 and 1120. A fifth portion of dry hydrogen traveling from tank 21030 follows the path indicated by arrow 1090 and travels past inner rotor bearing 1115 through region 1125 and potentially also past seal 1135. In a non-limiting embodiment seal 1135 may be a non-contacting seal for low resistance. Fluid which moves past seal 1135 would then enter the internal chambers of machine 21000 and would join the working fluid of machine 21000, subsequently being discharged by discharge port 21010 and entering fuel cell stack 1060, a possible path from the discharge to the fuel cell stack shown schematically by arrow 21015. A bypass around each bearing may be helpful to prevent high velocities of dry hydrogen through the bearings. High velocity dry hydrogen flow through the bearings may be detrimental because it could dislodge grease from the bearing. A bypass could take many forms and include one or more grooves in the bearing seat that allow fluid to pass around the bearing. This bypass ensures that the bearing is surrounded with dry hydrogen without risking high velocity hydrogen flow through the bearing that could dislodge lubricating grease from the bearing. In a non-limiting embodiment, the inner or outer diameters of the bearing seats and or inner or outer diameters of bearings are designed with fluid channels along their inner or outer diameters, to permit fluid flow around the inner and or outer diameter of bearings, providing protection to the aforementioned bearings from corrosive working fluids. The input port 21035 of the machine 21000 may receive recirculated working fluid via path 21020 from fuel cell stack 1060, which may contain water vapor and have a reduced quantity of hydrogen as some of the hydrogen is consumed by the fuel cell stack 1060. A water separator (such as water separator 1705 shown in FIG. 14) may separate some or all of the water from hydrogen returning via line 21020. The dry hydrogen tank 21030, in addition to providing the dry hydrogen via path 1040 for cooling, may also supply dry hydrogen to the fuel cell stack 1060 via path 21025 with connects to path 21015 with the flow of hydrogen supplied to the fuel cell stack 1060 controlled by valve 1145. The principles shown here will also apply to fluids other than dry and water-containing working fluid, in cases where exposure of certain elements of a machine to the working fluid is harmful and where it is acceptable for at least a small proportion of the less corrosive fluid bearing flushing fluid to enter into the working fluid.

A non-limiting embodiment shown in FIG. 19 is similar to that of FIG. 18, but demonstrates bypass channels which allow fluid to flow around of through the inner diameter of bearings, rather than the fluid traveling through the bearings themselves. Bearing flushing fluid is provided to bearing flushing regions within machine 22000 via inlet port 2310. The dispersion locations for the bearing flushing fluid may be chosen based on their proximity to fluid sensitive components or assemblies. For example, the channel 2305 is fed via the bearing flushing fluid inlet port 2310. The channel 2305 disperses bearing flushing fluid in the proximity of bearing 2315. Additional similar channels dispersing bearing flushing fluid in the proximity of other bearings are also shown in the embodiment shown in FIG. 19, which uses the same positive pressure method concept as that shown in the embodiment of FIG. 18 and described elsewhere in this disclosure. A portion of bearing flushing fluid flowing into channel 2305 would travel to region 2370 thereby pressurizing the region and preventing ingress of working fluid. A portion of bearing flushing fluid that enters inlet port 2310 would flow past bearing 2385, thereby filling and pressurizing the cavity housing bearing 2385 and protecting said bearing 2385. Seal 2390 (shown schematically in FIG. 19) may be a non-contacting seal which contains pressure from region 2365 and may allow leakage past said seal 2390 from region 2365 into region 2045 which could allow flow of fluid from region 2045 into the chambers of the inner and outer rotor in order to reduce or eliminate seal friction. A portion of bearing flushing fluid flowing into port 2310 may flow into channel 2360 and on into region 2370 which protects bearing 2315. A portion of the bearing flushing fluid flowing into channel 2360 may continue down channel 2360 until it reaches region 2375 which protects bearing 2395. A portion of the bearing flushing fluid flowing through channel 2360 may continue to bearing 2396, continue past bearing 2396 and enter region 2380 thereby pressurizing region 2380 thereby protecting bearing 2396. The inventor contemplates that other fluid sensitive components, such as those made of corrodible material may be protected by these channels. The inventor contemplates that the routing of these channels need not be through stationary components and could be, for example, through the shaft 2320. In the non-limiting embodiment shown in FIG. 19, a channel 2397 permits passage of bearing flushing fluid from channel 2360 past bearing 2385 and into region 2365. By routing bearing flushing fluid into regions on both sides of bearing 2385, flow of bearing flushing fluid through bearing 2385 can be minimized, reducing or eliminating the risk of displacing lubricants from bearing 2385. Similar design of bearing flushing fluid passageways can provide this same benefit to other bearings or components within a device. In the non-limiting embodiment shown in FIG. 19 it may be observed that in combination with dispersion of bearing flushing fluid into several regions or volumes of the device, close proximity seals such as but not limited to 2325, 2330, 2335, and 2340 create high enough positive pressure of dry hydrogen through the non-contacting seals to prevent back-flow of the working fluid containing deionized water through the seals.

In a rotary hydrogen compressor, as a non-limiting example, certain components for example rotor bearings, motor windings, and rust-prone components which are exposed to the working fluid which is a humid (water vapor containing) hydrogen mix may deteriorate prematurely as a result of the deionized water that is part of the recirculating humid working fluid gas flow.

A non-air-tight or non-contacting seal such as, but not limited to the seal or flow restriction that already exists from the small gaps between two or more rotors in an exemplary compressor, or the seal or flow restriction that exists from the small gaps between one or more rotors or pistons or other displacement means and the housing, can be used to provide enough resistance to flow through the bearing area that all or part of the humid gas from the compressor side of the seal or flow restriction will be prevented from entering the bearing area or areas. In this way, the pressured dry hydrogen that exists in the fuel tanks can be used to maintain a region of dry hydrogen around the bearings to prevent corrosion and extend service life without the detriment of using high-cost and high-friction seals. It is important to note that the temperature of the dry hydrogen will affect the temperature of the bearings and that if the dry hydrogen temperature is too low, it may cool the bearings or other components to a low enough temperature that it results in condensation of moisture on the bearings if there is any leakage of the humid working fluid back into the bearing flushing regions surrounding the bearings. Also, large temperature gradients may result in thermal stresses forming within the device. This may be especially important when hydrogen is stored in liquid form which may result in hydrogen flowing out of the tank at very low temperatures. In conventional fuel cells, line heaters may be used to warm hydrogen which is supplied to the fuel cell stack for similar reasons. Another option for heating the incoming dry hydrogen is to route the incoming hydrogen in near proximity to other heat generating elements such as the coils of an electric motor used to drive the compressor or a fuel cell stack. This can have the dual benefit of heating the incoming hydrogen and, at the same time, cooling the heat-generating components.

In the non-limiting embodiment shown in FIG. 19 hydrogen is supplied to the bearing flushing fluid inlet port 2310 of the device 22000 directly from a hydrogen storage tank. In order to warm hydrogen supplied to the first fluid inlet port, the inventor considers that the line supplying hydrogen to the first fluid inlet port may first be routed in close proximity to the fuel cell stack in such a way as to absorb heat from the stack and elevate the temperature of the hydrogen within the line. Additionally, the inventor considers that the line supplying hydrogen to the first fluid inlet port may first be routed in such a way and over such an area so as to absorb heat from the environment. Additionally, the inventor considers that the line supplying hydrogen to the first fluid inlet port may first be routed by other line heaters or heating elements present within the system. In addition, the inventor discloses an energy transfer device which routs inlet fluid to an integrated motor such that the inlet fluid acts to remove heat from the stator of the aforementioned integrated motor. In the non-limiting embodiment for example shown in FIGS. 1, 2, 3, 12, 13, 15, 16, and 17 dry hydrogen may be routed through the eccentric shaft 1905 and to ports 1920 which supply hydrogen to the stator 1041 of an integrated motor 1049 to cool the stator 1041. Additionally, the inventor considers that the line supplying hydrogen to the first fluid inlet port may first be routed in a combination of these methods.

Figure 20:
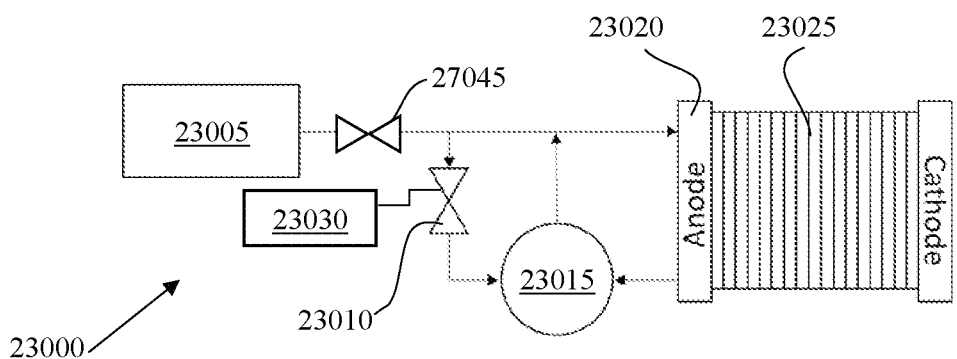
FIGS. 20-24 are partial system diagrams of respective fuel cell systems each including a hydrogen recirculation blower (HRB) and a different connection supplying dry hydrogen to the hydrogen recirculation blower (HRB).

FIG. 20 depicts a partial system diagram of a fuel cell system 23000. Included in the diagram are a hydrogen tank 23005, hydrogen fuel cell 23025 (in this non-limiting embodiment, a polymer electrolyte membrane (PEM) fuel cell) having anode (hydrogen inlet) 23020, hydrogen recirculation blower (HRB) 23015, and control valve 23010. Depicted by arrows between the components are the intended paths and directions of hydrogen flow. A fuel regulator valve 27045 is shown in FIGS. 20-24 which regulates the flow of fuel such as hydrogen from a fuel tank such as fuel tank 23005 in FIG. 20, 24005 in FIG. 21, 25005 in FIG. 22, 26005 in FIG. 23, and 27005 in FIG. 24 to the anode side inlet of a fuel cell such as fuel cell 23020 in FIG. 20, 24020 in FIG. 21, 25020 in FIG. 22, 26020 in FIGS. 23 and 27020 in FIG. 24.

The control valve 23010, also shown in FIG. 20, in tandem with an existing electronic control and controlled via a corresponding controller 23030, may be used to control the pressure and flow of hydrogen to the hydrogen recirculation blower (HRB) 23015, which may use the positive pressure method described herein to prevent the contact of corrosive fluids with fluid sensitive components or assemblies such as, for example, bearings. In a non-limiting embodiment one or more valves between the inlet and or discharge of the HRB 23015 may be configured to open when pressure builds within the interior of the HRB and may be configured to close when pressure drops within the interior of the HRB. As described in more detail below, the valve or valves may be configured to open partially in response to a measured pressure or may be configured to open fully. This may be particularly useful for preventing backflow during start-up and shut down of the HRB. In a fuel cell application a small amount of backflow of potentially corrosive anode-loop fluid could decrease the lifespan and/or efficiency of the HRB. In a non-limiting embodiment of a system 27000 shown in FIG. 24 a first shut down valve 27040 between the anode side discharge of a PEM 27025 and an HRB 27015 and second shut down valve 27030 located between the HRB 27015 discharge and a line running from a hydrogen storage tank 27005 and the PEM 27025 anode side inlet 27020 are arranged to prevent fluid from flowing into or out of an HRB when the HRB is not running. This may prevent humid working fluid from the HRB loop from entering the HRB when it is not running, thereby extending the life of fluid sensitive components inside the HRB. In such an embodiment, an HRB shut down process may be used wherein an HRB is designed to purge hydrogen, for example by opening a valve 27035 between a purge fluid source, such as but not limited to a hydrogen tank 27005, and HRB purge fluid port located on the housing of HRB 27015, so as to flush hydrogen from tank 27005 through HRB 27015, removing humid working fluid from HRB 27015, and then closing first shutdown valve 27040 and second shut down valve 27030. For reference, fuel regulator valve 27045 is shown which regulates the flow of fuel such as hydrogen from tank 27005 to the anode side inlet 27020 of PEM 27025.

Figure 21:
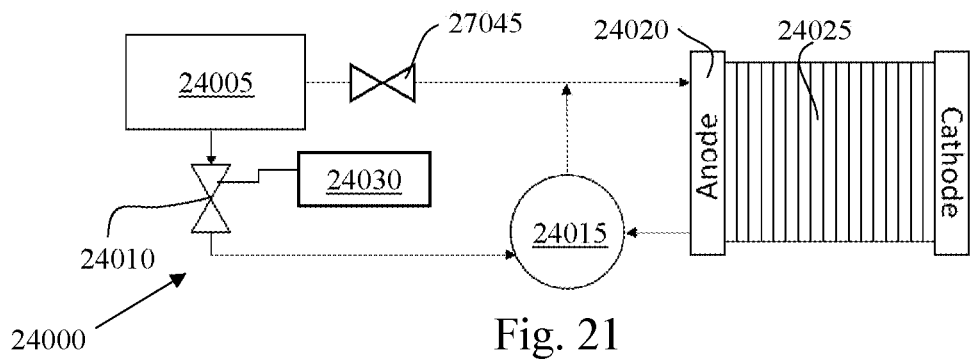

Alternatively, as depicted in the non-limiting embodiment shown in FIG. 21, a system 24000 may be constructed in which the valve 24010 controlled by controller 24030 is located between a tank 24005, and a device 24015 using the positive pressure method to prevent the contact of corrosive fluids with a bearing or arrangement of bearings. Again, fuel cell 24025 may have anode (hydrogen inlet) 24020.

Figure 22:
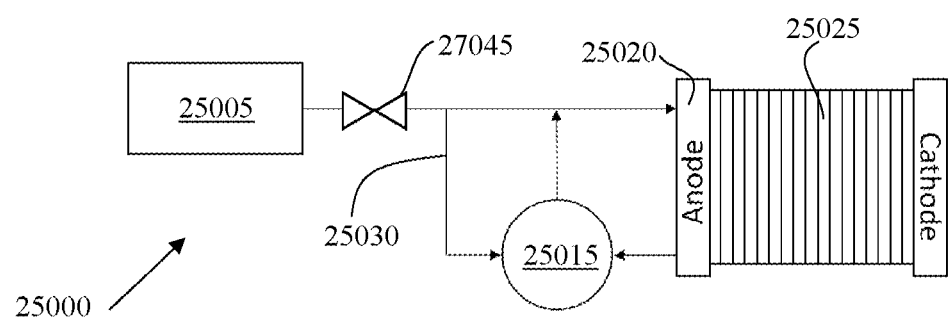

Alternatively, as depicted in the non-limiting embodiment shown in FIG. 22, a system 25000 may be constructed without an external valve. In such an arrangement, the flow of hydrogen to the device 25015 using the positive pressure method to prevent the contact of corrosive fluids with a bearing or arrangement of bearings may be controlled by features internal to the device or may be controlled by the release rate of hydrogen from the tank 25005. In this non limiting embodiment, the line 25030 which feeds the positive pressure region of a device 25015 which, in this non-limiting embodiment is a HRB, is located between a flow path providing hydrogen to the anode 25020 inlet of a PEM fuel cell 25025 and a supply port on a device.

Figure 23:
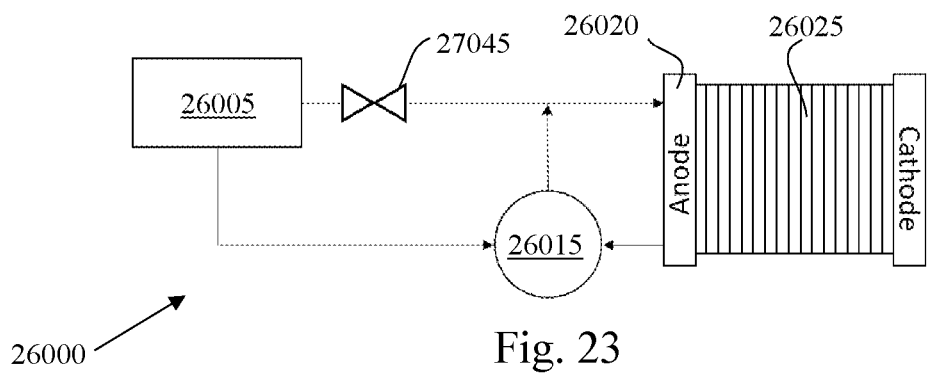
Figure 24:
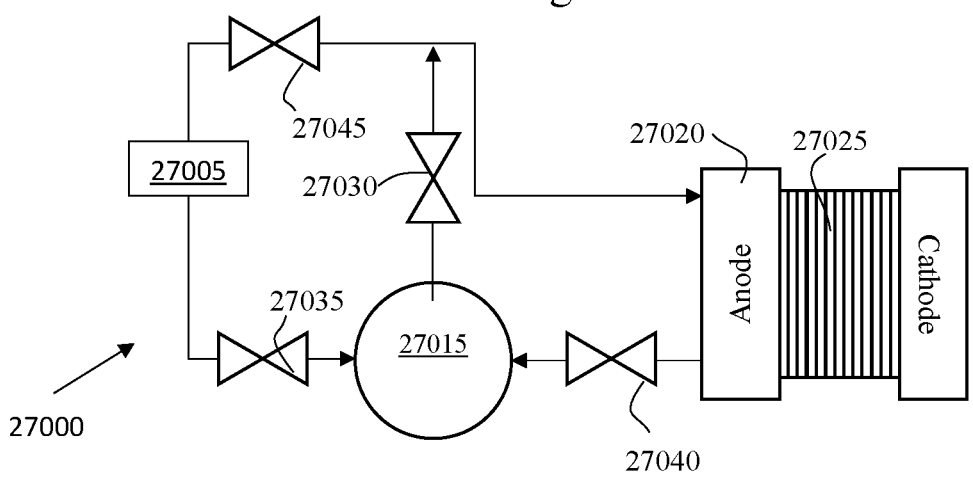

Alternatively, as depicted in the non-limiting embodiment shown in FIG. 23 a system 26000 may be constructed in which the line which feeds the positive pressure region of a device 26015 (in this non-limiting embodiment, a HRB) is located between a tank 26005, and a device 26015 using the positive pressure method to prevent the contact of corrosive fluids with a bearing or arrangement of bearings. Again, fuel cell 26025 with anode (inlet) 26020 is present.

In the non-limiting embodiment shown in FIG. 26 a machine 29000 comprises an inner rotor 29005, outer rotor 29010, housing 29015, and input shaft 29020. In the non-limiting embodiment shown in FIGS. 26 and 27 the housing 29015 is designed to have axial ports as opposed to the radial ports shown in FIGS. 1-13, 15, and 18-19. In the non-limiting axial port embodiments shown in FIGS. 26 and 27 a port plate 29035 seals against the outer rotor and serves as a plenum for the chambers, connecting the chambers to the working fluid inlet port (not visible in FIG. 26) and discharge port 29030. Bearing flushing fluid inlet port 29040 supplies a bearing flushing fluid to a channel which runs through housing 29015, permitting bearing flushing fluid to flow to positive pressure regions of the housing containing bearings. The aforementioned positive pressure regions contain fluid which is higher pressure than the pressure of the working fluid contained between the chambers between inner rotor 29005 and outer rotor 29010, preventing ingress of working fluid into the bearings. Lines 29025, 29065, 29070, and 29090 represent paths of bearing flushing fluid to the positive pressure regions such as region 30100 within the housing 29015, the aforementioned regions containing bearing 29055 of inner rotor 29005 and bearing 29060 of outer rotor 29010. The seals, for example seals between the inner rotor 29005 and outer rotor 29010 and between the outer rotor 29010 and the housing 29015 may be but are not limited to for example contact seals, close-contact seals, or non-contacting seals. A small amount of leakage of the bearing flushing fluid into the lower pressure sealing volumes between the inner and outer rotor is acceptable. In a non-limiting embodiment shown in FIGS. 26-27 machine 29000 is a hydrogen recirculation blower (HRB) wherein the working fluid contained in the chambers between the inner rotor 29005 and outer rotor 29010 is a humid hydrogen nitrogen mix from the anode side of a fuel cell stack and the bearing flushing fluid is dry hydrogen. Thus, in this non-limiting HRB embodiment any dry hydrogen bearing flushing fluid which leaks past the seals into the chambers would simply join the humid hydrogen mix working fluid without harming the effectiveness of the HRB.

The inventor contemplates that, in embodiments where the performance of seals separating a first portion of the device from a second portion of the device is appropriate, it may be possible to supply hydrogen to the anode side of the fuel cell principally or entirely from the bearing flushing fluid inlet port 29040, rather than adding new dry hydrogen to the system via a different route as the hydrogen is consumed by the fuel cell. This may allow fewer lines to be run from the hydrogen storage tank to the anode side of the fuel cell stack, resulting in reduced system weight, complexity, and cost. Where this is desirable, the designer may, but need not necessarily intentionally use seals having reduced sealing performance or higher leakage separating first portions of the device from second portions of the device in order to reduce the drop in pressure of hydrogen supplied via the hydrogen fuel tank and enable sufficient flow of hydrogen into the system, regardless of any changes that may occur to the hydrogen supply pressure. This may simultaneously enable cheaper device construction and improved system performance. The first working fluid may enter the device through inlet 2350 and exit via discharge 2355 as shown in FIG. 19. FIGS. 26 and 27 are alternate views of the same embodiment. The positive pressure within the bearing-containing positive pressure regions 30095 and 30100 (shown in FIG. 27) reduce or prevent ingress of the corrosive humid hydrogen gas mix from damaging the bearings as described elsewhere in this disclosure. Positive pressure regions, shown in FIG. 27 via dashed rectangles 30105 and 30110 (for simplicity the complex three-dimensional volume of the bearing flushing areas in this embodiment are simplified and shown via dashed rectangles), are volumes which encapsulate the inner rotor and outer rotor bearings. A portion of the bearing flushing fluid follows the path indicated by line 29025, coming into contact with a first axial side of inner rotor bearing 29055, flowing past said inner rotor bearing 29055, into the inner diameter of inner rotor input shaft 29020 and through ports 30075 which lead to positive pressure region 30100, positive pressure region 30100 also visible in more detail in FIG. 27, the region 30100 bringing the bearing flushing fluid into contact with the second axial sides of inner rotor bearing 29055 and outer rotor bearing 29060. Line 30045 shown in FIG. 27 shows the path of bearing flushing fluid between port 29040 and positive pressure region 30100 within housing 29015, the bearing flushing fluid being exposed to both axial sides of inner rotor bearing 29055 and also to a second axial side of outer rotor bearing 29060 of outer rotor 29010. A sensor such as an oxygen sensor may be used to verify that ambient air, which may contain moisture, is not present in the bearing flushing fluid. Line 30050 shows the path of a portion of the bearing flushing fluid from port 29040 to a first axial side of outer rotor bearing 29060 and to region 30110. Arrow 30090 shows the path of bearing flushing fluid through the inner diameter of shaft 29020 to supply bearing flushing fluid to the bearings of the opposite axial side of the inner rotor 29005 which are in region 30105.

H2 Cooling

Using waste heat from a motor to heat hydrogen entering an HRB such as machine 17000 may have the surprising benefit of providing a significant cooling effect to the motor potentially allowing for higher efficiency, longevity, and power output. For reference, in this disclosure dry hydrogen refers to hydrogen supplied from a storage tank, such as storage tank 21030 in FIG. 18, as opposed to referring to the humid (water containing) hydrogen working fluid of an HRB. In a HRB configuration shown in the non-limiting embodiment shown for example in FIGS. 1, 2, 3, 12, 13, 15, 16, and 17 dry hydrogen may be routed through the stator 1041 of a motor integrated into an inner rotor as discussed elsewhere in this application to cause hydrogen to flow past the coils of the stator, thereby cooling the stator 1041. In a non-limiting embodiment shown in FIG. 17, eccentric shaft 1905 contains one or more channels 2135. These channels may be used to route dry hydrogen, cooling fluid, or wires as desired. For example and as discussed elsewhere in this disclosure, in a non-limiting embodiment shown in FIG. 17, coolant such as but not limited to water may be routed to inlet port 2130 and then travel through channels 2135 in eccentric shaft 1905 and travel to ports such as port 1920 located near the stator coils of an integrated motor such that water flowing out of port 1920 flows over the stator, thereby cooling the stator. Alternatively, these channels could alternatively carry cool dry hydrogen for the same purpose. Dry hydrogen supplied in this method would then be expelled from the discharge port of the HRB and passed onwards to, for example, a PEM fuel cell anode to produce power. A view of eccentric shaft 1905, integrated motor stator 1041, and stator cooling ports 1920 in relation to stator 1041 is shown in FIG. 16. Alternatively, or in combination with the flow of water, hydrogen, or other coolant through channels 2135, hydrogen may flow through passages which pass near to the stator 1041, allowing the hydrogen flow to remove heat from the stator 1041 of the electric motor or generator without directly coming into contact with the stator coils. Also, in the non-limiting example shown in FIG. 17, passage 2120 lacks a stator cooling port analogous to port 1920 connected to channel 2135, allowing hydrogen to pass through the passageways and remove heat from shaft without coming directly into contact with the stator. For example, in a non-limiting embodiment dry hydrogen from the storage tank flows into eccentric shaft 1905 via port 2110, passes through channel 2120 which runs in close proximity to stator 1041, and exits shaft 1905 via port 2125 without coming into contact with the stator. In a non-limiting embodiment dry hydrogen is first routed in close proximity to the stator of a motor, such as via channel 2120 from port 2110 through to port 2125 shown in FIG. 17, and is then subsequently used as a bearing flushing fluid, for example by connecting the port 2125 of channel 2120 to channel 2135 which in turn connects to port 1920 which allows the fluid to enter a space between the inner rotor and shaft occupied by the stator coils, and which acts as a bearing flush port as this space is connected to the bearings 1050 which support the inner rotor, as shown for example in FIG. 1. These bearings may also connect to a space bounded by the inner rotor, outer rotor and housing, which may also, as shown in FIG. 1, connect to a main working volume of the device between the inner rotor and outer rotor. The bearings 1054 supporting the outer rotor may also connect to the space bounded by the inner rotor, outer rotor and housing, and may receive flushing fluid for example via the shaft, via a separate housing channel, or via a space between the outer rotor and housing. FIG. 17 also shows electrical wire channels 2105 as well as fluid channels 2120 and 2135. These electrical wire channels can allow for routing of electrical power or controls signals to the electrical motor. When the disclosed invention is used in certain applications such as HRB applications, a surprising benefit of using the hydrogen working fluid as a injected fluid for an integrated motor stator is that as the HRB is operated at higher flow rates, resulting in higher waste heat production from the integrated motor, the flow of working fluid injected fluid and thereby the cooling effect provided by the flow of working fluid also increases along with the increase in waste heat production of the integrated motor. In a non-limiting embodiment in which the disclosed invention is used in a HRB application, a portion of the new dry hydrogen entering the anode side HRB loop is directed to flow through the support element (e.g. eccentric shaft) cooling channels, such as channels 2120 and or 2135, and is used to cool the stator, such as stator 1041, of an integrated motor before the aforementioned hydrogen joins the working fluid of the HRB. In a non-limiting embodiment in which the disclosed invention is used in a HRB application, all of new dry hydrogen entering the anode side of the HRB loop flows through the eccentric shaft and is used to cool the stator of an integrated motor stator before the aforementioned hydrogen joins the working fluid of the HRB. In a non-limiting embodiment in which the disclosed invention is used in a HRB application, under some operating conditions a portion of the hydrogen blown by the HRB flows through the eccentric shaft and is used to cool the stator of an integrated motor stator while in other operating conditions all of the hydrogen flowing into the HRB is routed into the eccentric shaft and is routed to the stator of an integrated motor to cool the stator. In any embodiment of the invention disclosed wherein dry hydrogen is used to cool components of an HRB, the same fluid may be used to provide positive pressure to the regions containing bearings to prevent entry of lower-pressure humid gas contained in other portions of the machine.

Outer Rotor/Radial Ports

Figure 4:
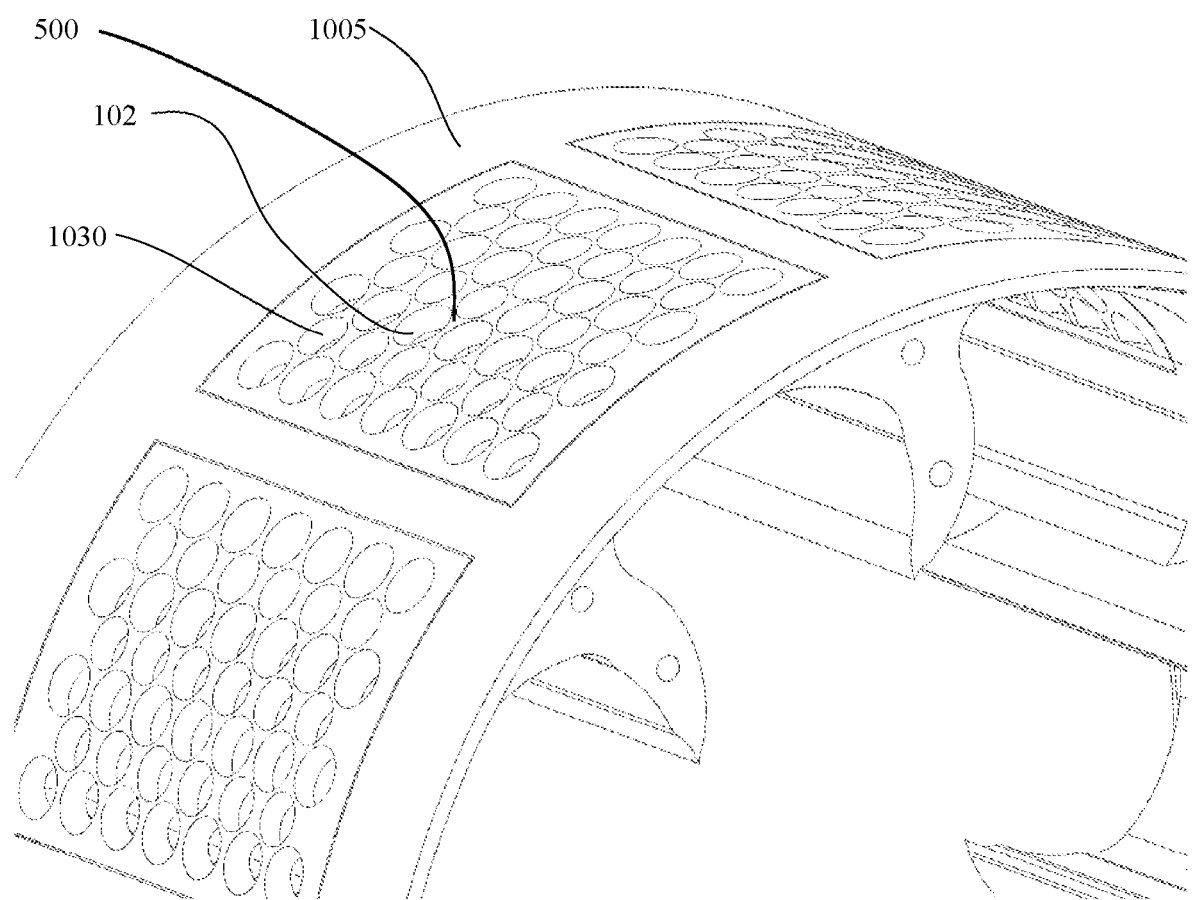
FIG. 4 is an isometric view of a portion of the outer rotor shown in FIG. 3.
Figure 5:
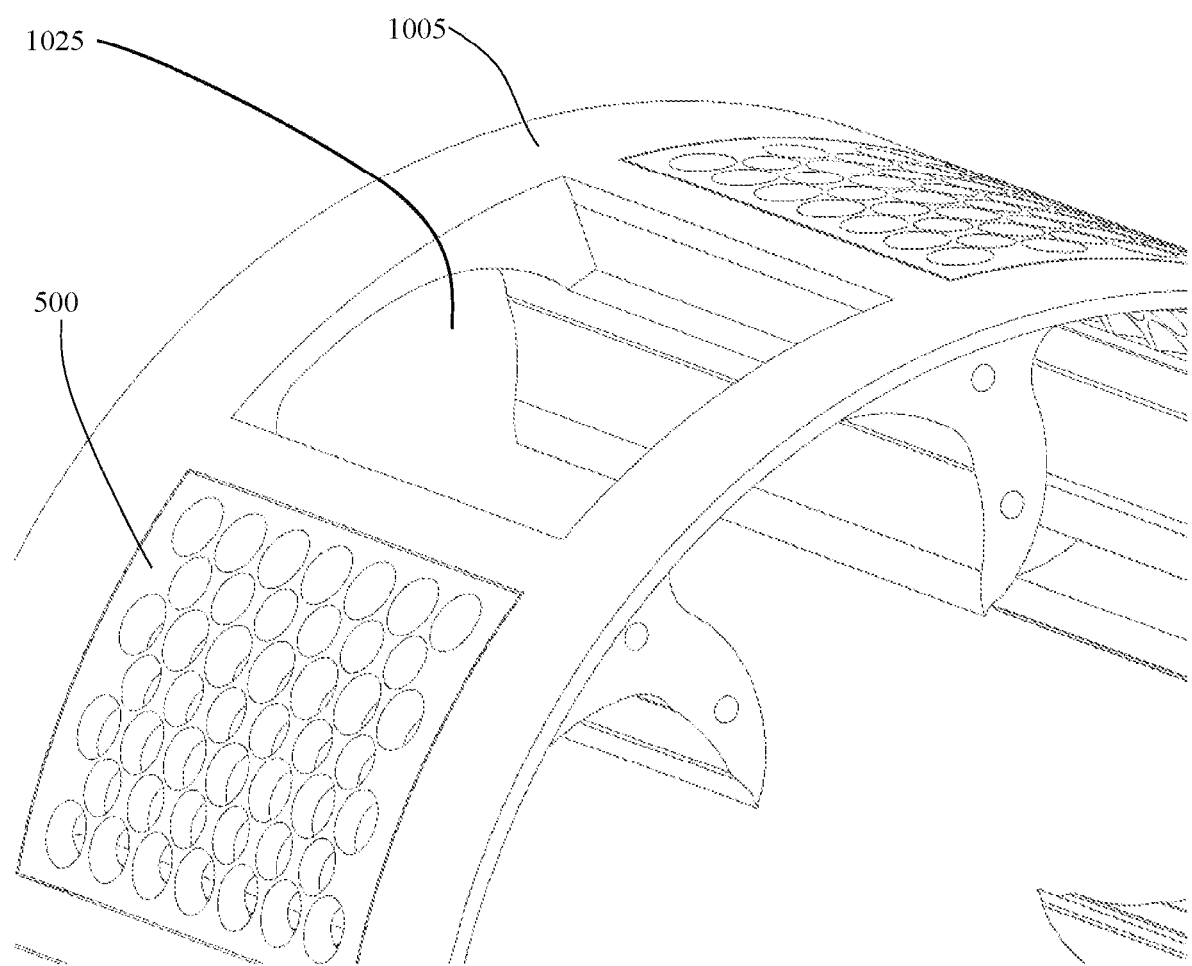
FIG. 5 is the view of FIG. 4 but with an insert of the outer rotor shown removed to better show a port in the outer rotor filled in normal operation by the insert.
Figure 6:
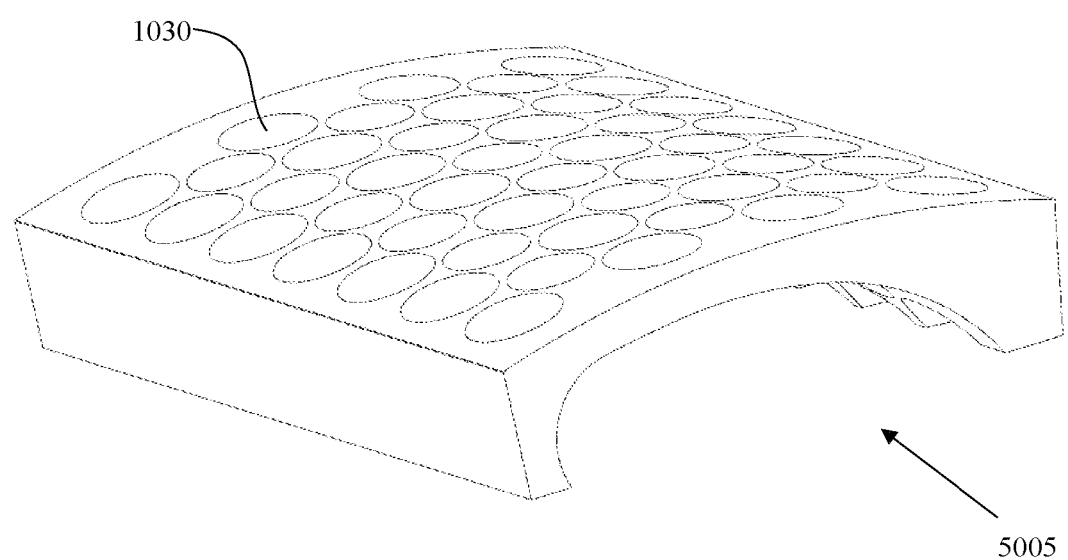
FIG. 6 is an isometric view of the insert of the outer rotor removed in FIG. 5.
Figure 7:
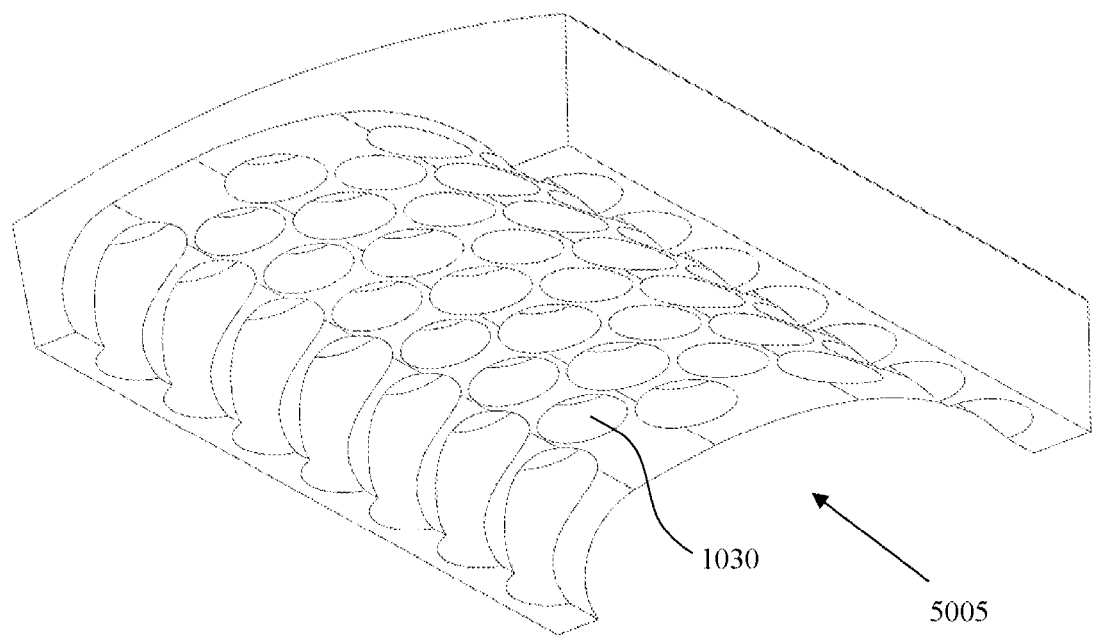
FIG. 7 is an isometric view of the insert of FIG. 6 viewed from a different direction.
Figure 8:
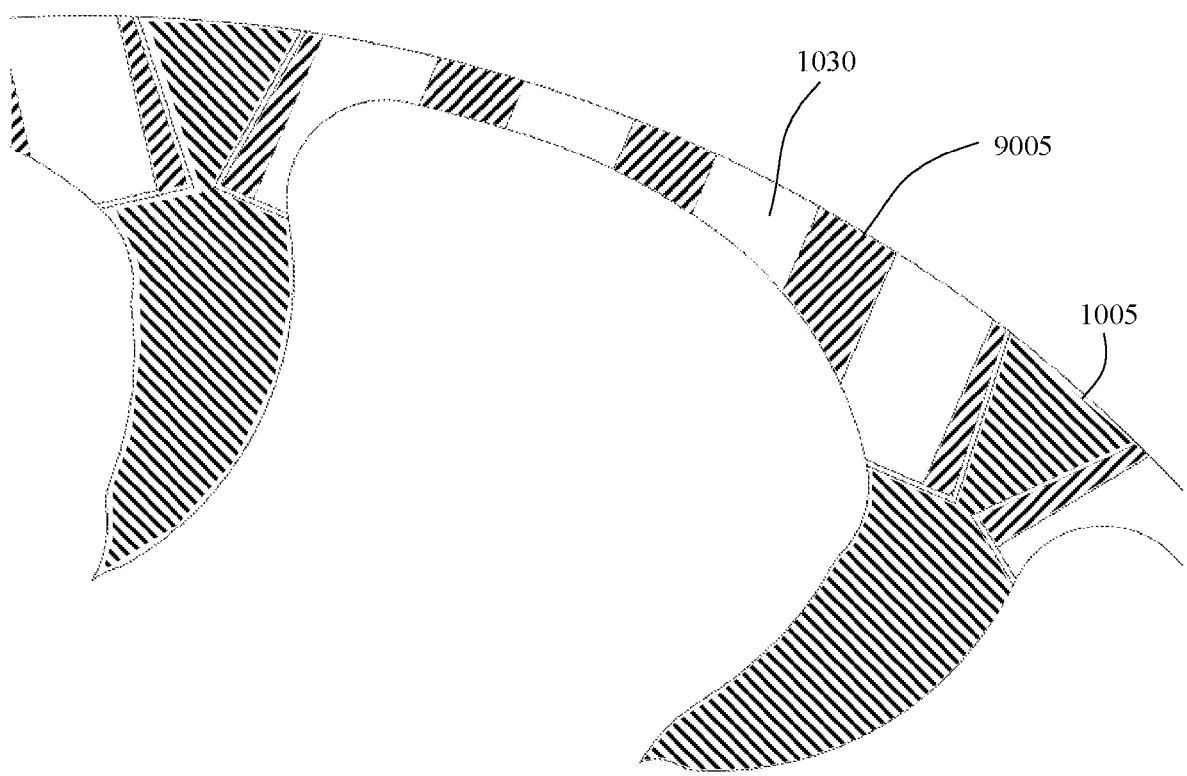
FIG. 8 is an axial cross-section view of a second embodiment of an outer rotor for the exemplary energy transfer machine of FIG. 1, the second embodiment having radially tapered inserts.
Figure 9:
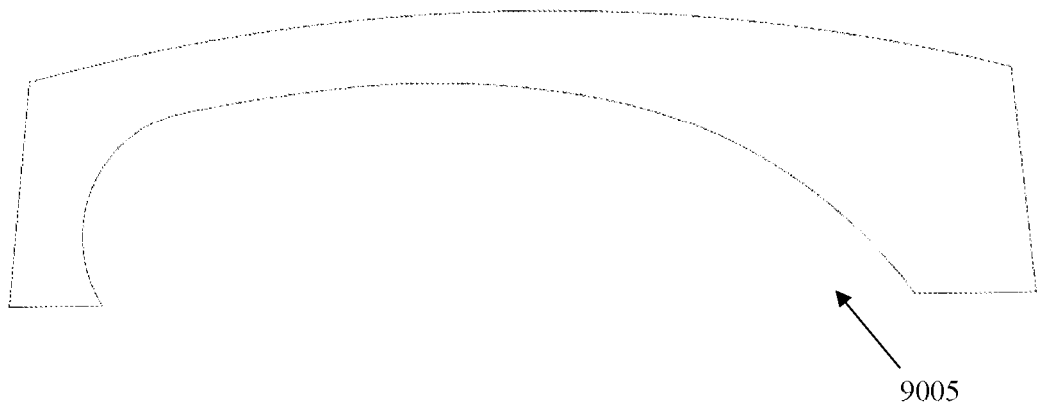
FIG. 9 is an axial view of a tapered insert of the embodiment of FIG. 8.
Figure 10:
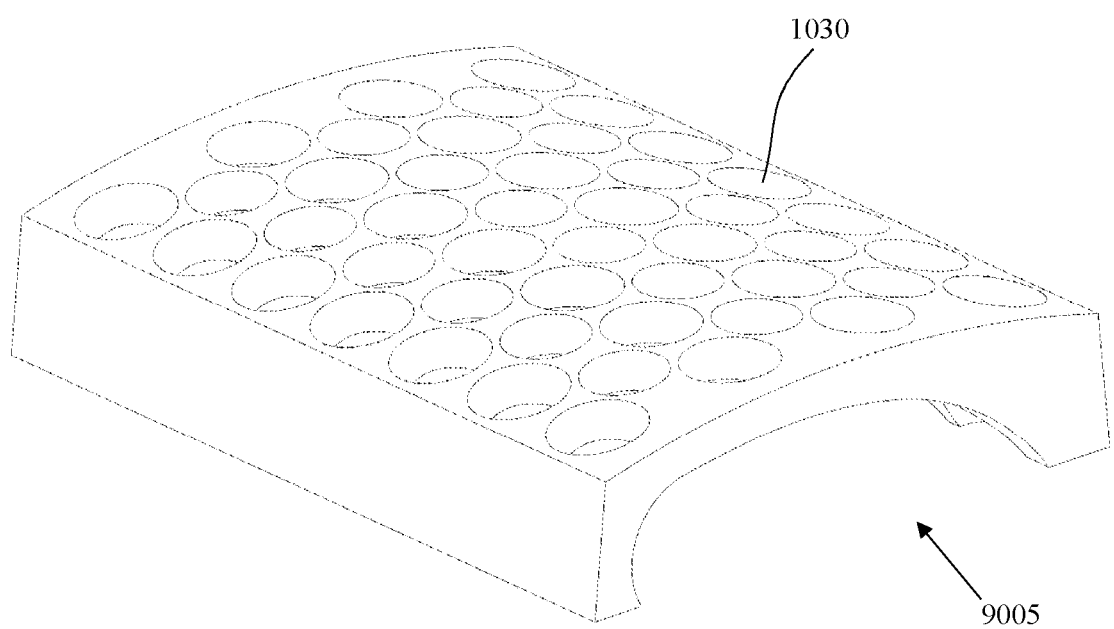
FIG. 10 is an isometric view of a tapered insert of the embodiment of FIG. 8.

In a non-limiting embodiment shown for example in FIGS. 1-13, and 15 the outer rotor 1005, 3005 has a plurality of radial-facing ports 1025 which permit fluid flow from the inlet port to the chambers 1020 formed between the inner and outer rotor projections as well as between the chambers 1020 and the discharge port 2020. In a non-limiting embodiment, the plurality of radially-facing ports may be further divided into a plurality of sub-ports 1030, shown in FIG. 3. In the non-limiting embodiment shown for example in FIGS. 2 and 3, the plurality of sub-ports 1030 are cylindrically shaped allowing for ease of manufacturing. However, the inventor anticipates that other port shapes may be desirable. For example, shapes with a sharp point such as teardrop-shaped or triangular-shaped ports may offer more gradual port opening between the inlet and exhaust ports and the chambers 1020 when the narrow point of the port is oriented to point largely tangent to outer rotor and in the direction of rotation of the outer rotor. The direction of rotation of the inner and outer rotor is shown by arrow 2095 in FIG. 2. Other sub-port shapes, such as square-shaped sub-ports, triangle-shaped sub-ports, and hexagon-shaped sub-ports may allow for higher 2-dimensional packing density and thereby larger overall port cross-sectional area and or higher strength-to-weight. As shown in FIGS. 4 and 5, the sub-ports 1030 may be formed into inserts 5005 which are installed into the radial ports 1025 to simplify and/or speed up manufacturing. This method would allow the sub port inserts 5005 to be manufactured separately, for example by stamping/punching, and then assembled into the radial-facing ports 1025 of the outer rotor. The outer rotor 3005 may include a frame structure 1005 which supports or is integral with inward projections 2010 and defines the radial ports 1025. In the non-limiting example shown in FIGS. 6-8, sub-port insert 5005 sub-ports 1030 are through-holes, making the insert part 5005 well-suited to stamping/punching. Alternatively, in embodiments wherein sub-port inserts are comprised of certain plastics, the part may be well suited to injection molding. The sub-port inserts may be secured to the radial-facing ports 1025 for example via adhesive, via mechanical fasteners such as but not limited to dowels, screws, bolts, and/or via thermal-fitting. In the non-limiting embodiment shown in FIGS. 8-10, the inserts are tapered inserts 9005; the taper secures the aforementioned sub-port inserts 9005 from being ejected in the radial direction during rotation of the outer rotor 3005. These inserts 9005 could be inserted into the outer rotor 3005 in the axial direction. Alternatively, the sub-ports could be installed radially via thermal fitting if the draft angle is small enough.

In a non-limiting embodiment, the sub ports 1030 may be overlapped or staggered such that adjacent sub-ports do not move past the ports in unison. This may be used to alter the quality of the sound of the machine, so as to be more palatable to the human ear or to simply decrease the sound amplitude of the device.

Inner Rotor Grooves

Figure 28:
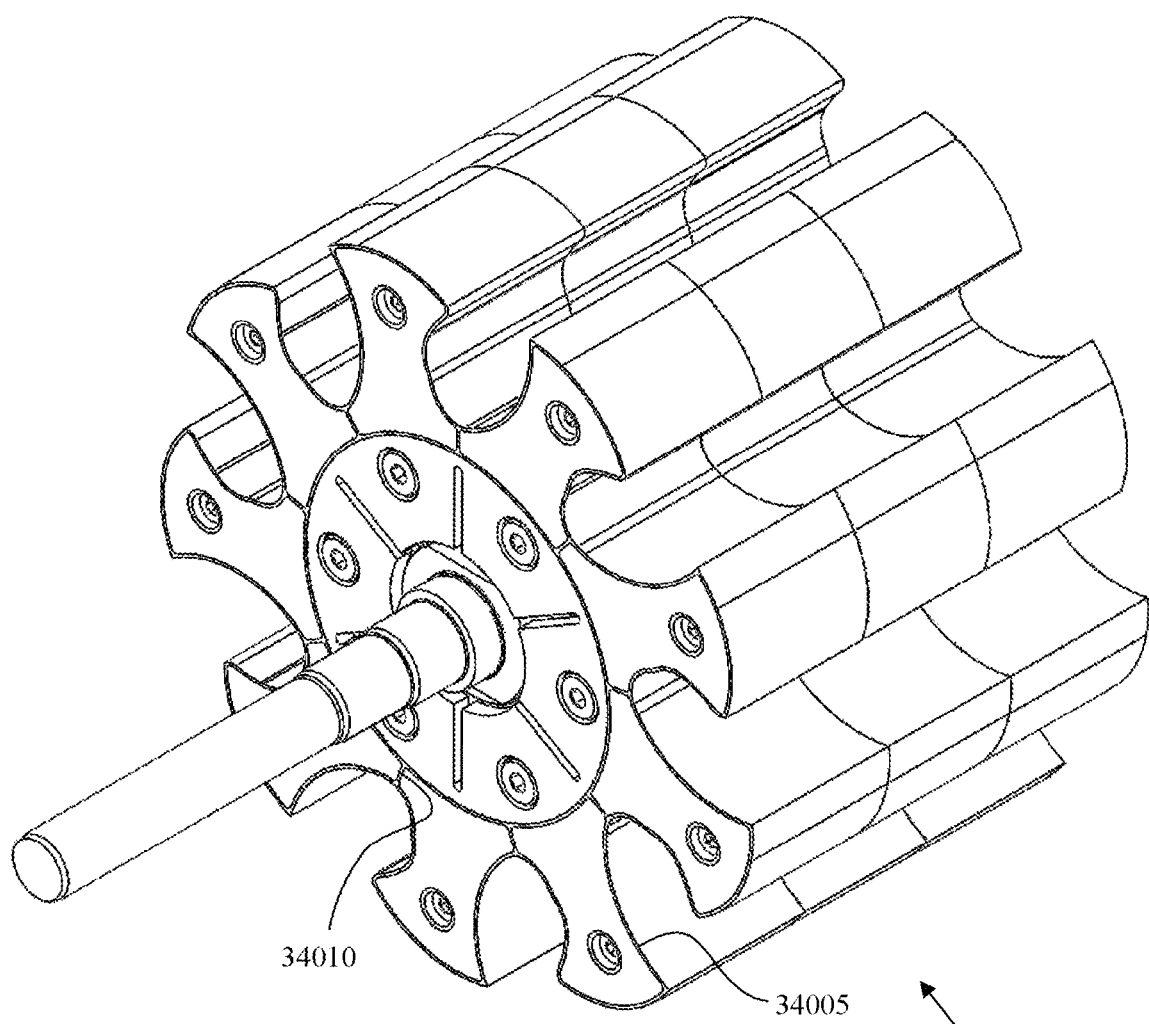
FIG. 28 is an isometric view of an inner rotor of the exemplary energy transfer machine of FIG. 26.
Figure 29:
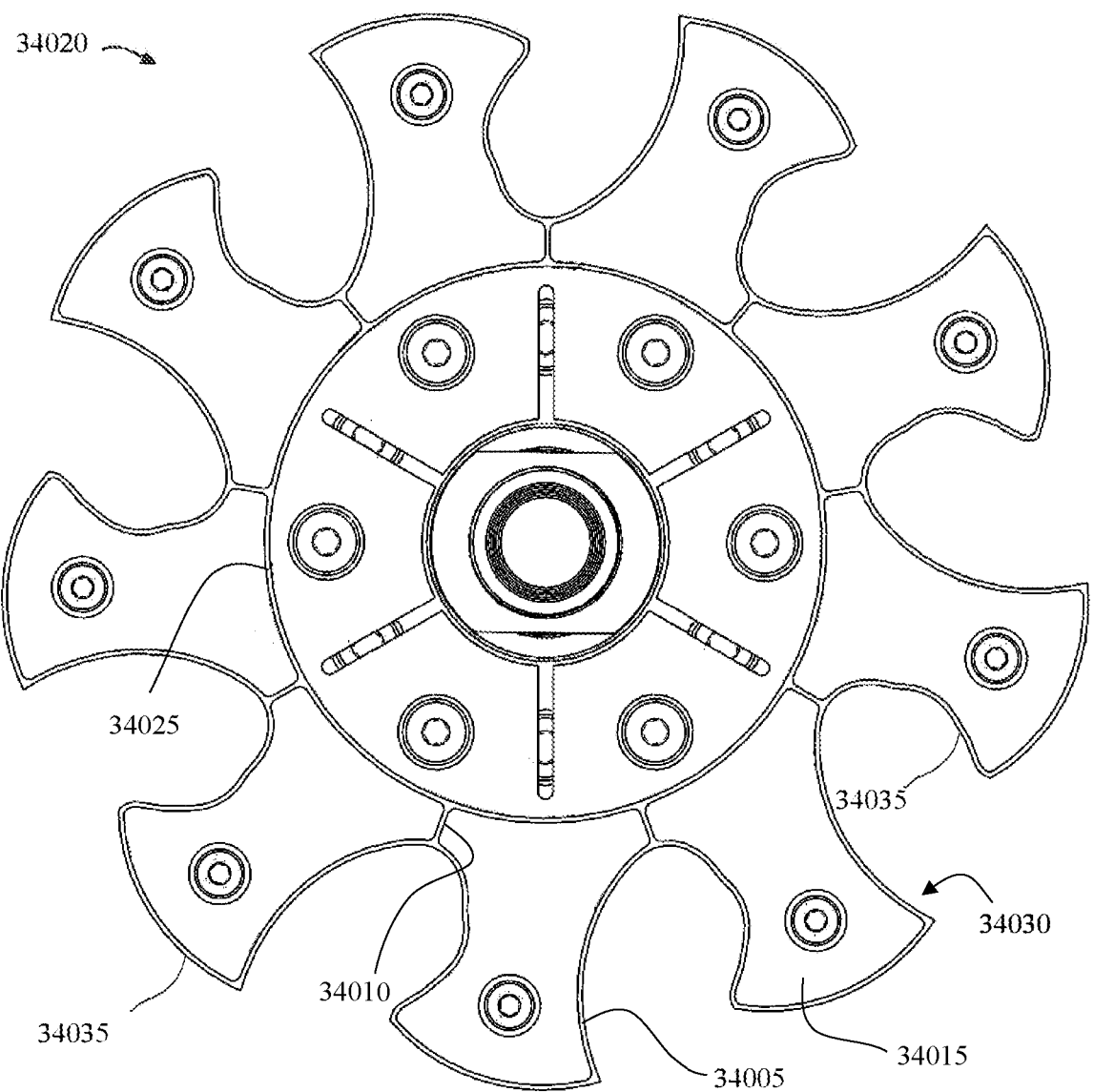
FIG. 29 is an axial view of the inner rotor of the exemplary energy transfer machine of FIG. 26.

The inner rotor may include at least one axially outer surface configured to seal against a corresponding axially inner surface of the outer rotor, the at least one axially outer surface defining a proud portion to seal against the corresponding axially inner surface. This feature may be combined with any of the other features disclosed in this document. The axial sealing surfaces of inner rotor 34020 may be designed to bear against the corresponding sealing surfaces of an outer rotor to wear in or machine the sealing surfaces of the inner rotor and/or outer rotor. In a non-limiting embodiment shown in FIGS. 28-29 the outer perimeter of an inner rotor 34020 features a raised portion 34005 which sits proud of a secondary axial region. In a non-limiting embodiment, the outer perimeter sits proud of the secondary region by an amount that allows it to wear quicker due to smaller surface area, but is small enough that the area behind this raised portion still provides a level of sealing benefit. The purpose of the raised section is to reduce the surface area of the area which would abrade. In a non-limiting embodiment the raised portion sits proud of the secondary region proud by 2 thousandths of one inch. In the non-limiting embodiment shown in FIGS. 28-29 the sealing surfaces measure 20 thousandths of one inch across. The inventor anticipates that it may be desirable to vary the amount that the raised portion sits proud of the secondary region depending on for example the material choice of the inner rotor sealing surfaces, working fluid, and desired pressure between the inner rotor sealing surfaces and corresponding sealing surfaces located on the outer rotor. A sealing circle 34025, forming a ring encircling the second axis and inward of the outer rim 34035 of the inner rotor, provides a secondary seal, which also sits proud of the to reduce the leakage of any fluid which passes raised portion 34005. Seal connectors 34010 connect the sealing raised portion 34005 and sealing circle 34025 and separate the individual inner rotor lobes 34030 into individually sealed regions 34015, thereby providing an impediment to any fluid which has leaked past raised portion 34005 and preventing or reducing fluid flow between the axial sealed regions 34015 of each inner rotor lobe 34030. These radially oriented proud portions connected to the ring connect in the embodiment shown to the inner rotor troughs, but could also connect to elsewhere on the outer rim 34035. Reducing the surface area of the sealing surfaces of the inner rotor increases the sealing pressure between the axial sealing surfaces of the inner and outer rotor without requiring an increase in force between the aforementioned axial sealing surfaces of the inner rotor. Increasing the pressure experienced by the outer rotor axial sealing surfaces and inner rotor axial sealing surfaces aids the wear-in process of the inner rotor. Increased pressure may also increase sealing performance because it is easier to axially deform a laterally thin seal. Thus, laterally thinner sealing surfaces of an inner rotor would better conform to the sealing surfaces. In a non-limiting embodiment, the axial sealing surfaces between the inner and outer rotor are designed to be rough in order to abrade, wear, or erode, cut or otherwise shape the axial sealing faces of either of the inner or outer rotor. In a non-limiting embodiment, either or both of the at least one axially outer surface of the inner rotor and the corresponding axially inner surface of the outer rotor is significantly rough to abrade the other of the at least one axially outer surface of the inner rotor and the corresponding axially inner surface of the outer rotor. The axial sealing surfaces of the outer rotor may for example be roughened such as by sandblasting or other means to accelerate wear-in between the axial sealing surfaces of the outer rotor and the inner rotor axial sealing surfaces. In a non-limiting embodiment, the outer rotor axial sealing endplates which seal against the inner rotor are sandblasted steel and the inner rotor axial sealing surfaces are a self-lubricating PEEK. In embodiments wherein PEEK is used, the pitted sandblasted surfaces have a surprising benefit of improving sealing as the inner rotor wears-in. It is believed by the inventor that the PEEK material fills in the pores of the sandblasted steel, forming a smooth sealing surface. The inner rotor may be designed to thermally expand in the axial direction so as to achieve a seal of the desired gap, contact force, or performance between the inner and outer rotor during operation.

Figure 30:
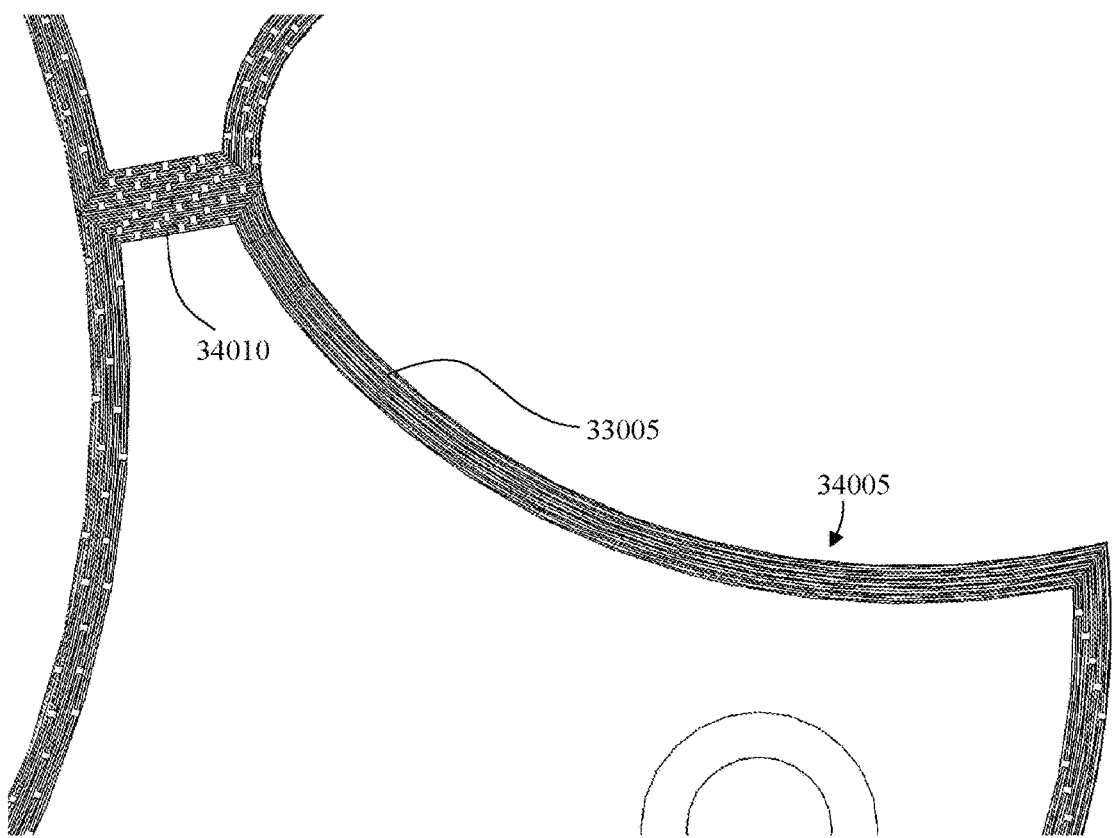
FIG. 30 is a closeup axial view of a portion of the inner rotor of FIG. 29 showing channels on an axial surface.
Figure 31:
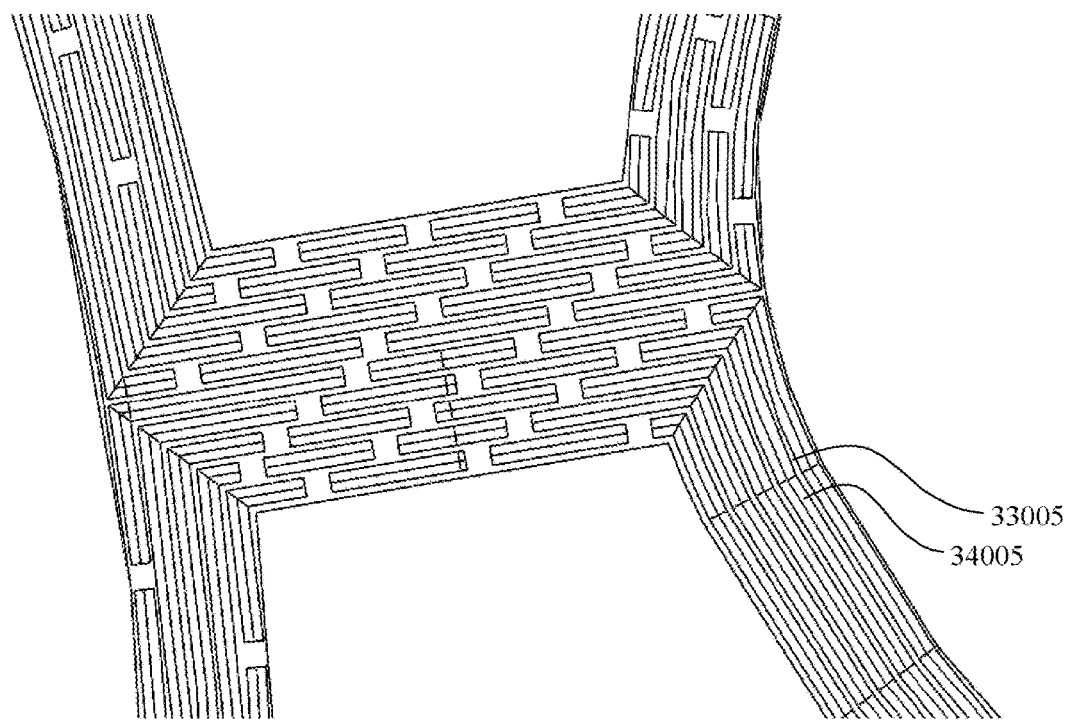
FIG. 31 is a further closeup axial view of the portion of the inner rotor shown in FIG. 30, showing the channels in further detail.

In a non-limiting embodiment shown in FIG. 30, the raised portion 34005 has a plurality of discontinuous channel-like grooves 33005 along the axial sealing surfaces of the inner rotor. FIG. 31 shows a close-up of channels 33005. The channel features 33005 along the raised portion 34005 result in thin sections of sealing material along the perimeter of the grooves 33005 which may fold over into the groove, aiding wear-in and sealing. Injection molding may be well suited to the complex geometry and fine detail of this embodiment.

In the claims, the word "comprising" is used in its inclusive sense and does not exclude other elements being present. The indefinite articles "a" and "an" before a claim feature do not exclude more than one of the features being present. Each one of the individual features described here may be used in one or more embodiments and is not, by virtue only of being described here, to be construed as essential to all embodiments as defined by the claims.

The invention claimed is:

1. An internal gear pump, internal gear pump compressor, internal gear pump expander, or internal gear hydraulic motor comprising:
    a housing;
    an outer rotor having radially inward-facing projections, the inner outer rotor being mounted on a first bearing for rotation relative to the housing about a first axis defined by the first bearing; and
    an inner rotor having radially outward-facing projections configured to mesh with the radially inward-facing projections of the outer rotor, the inner rotor being mounted on a second bearing for rotation relative to the housing about a second axis defined by the second bearing, the second axis being parallel to and offset from the first axis;
    the inward-facing projections of the outer rotor at least in part defining variable volume chambers between the inward-facing projections of the outer rotor;
    the inward-facing projections of the outer rotor and the outward-facing projections of the inner rotor intermeshing at a top dead center (TDC) portion of the pump or motor; and
    the inner rotor including at least one axially outer surface configured to seal against a corresponding axially inner surface of the outer rotor, the at least one axially outer surface of the inner rotor defining a proud portion to seal against the corresponding axially inner surface of the outer rotor;
    in which the proud portion includes a ring encircling the second axis and inward of an outer rim of the inner rotor; and
    in which the proud portion includes plural segments connected to the ring and oriented radially.

2. An internal gear pump, internal gear pump compressor, internal gear pump expander, or internal gear hydraulic motor comprising:
    a housing;
    an outer rotor having radially inward-facing projections, the inner outer rotor being mounted on a first bearing for rotation relative to the housing about a first axis defined by the first bearing; and
    an inner rotor having radially outward-facing projections configured to mesh with the radially inward-facing projections of the outer rotor, the inner rotor being mounted on a second bearing for rotation relative to the housing about a second axis defined by the second bearing, the second axis being parallel to and offset from the first axis;
    the inward-facing projections of the outer rotor at least in part defining variable volume chambers between the inward-facing projections of the outer rotor;
    the inward-facing projections of the outer rotor and the outward-facing projections of the inner rotor intermeshing at a top dead center (TDC) portion of the pump or motor; and
    the inner rotor including at least one axially outer surface configured to seal against a corresponding axially inner surface of the outer rotor, the at least one axially outer surface of the inner rotor defining a proud portion to seal against the corresponding axially inner surface of the outer rotor;
    in which the proud portion includes an outer rim of the inner rotor; and
    in which the proud portion includes a ring encircling the second axis and inward of the outer rim of the inner rotor and plural segments connecting the ring and outer rim.

3. An internal gear pump, internal gear pump compressor, internal gear pump expander, or internal gear hydraulic motor comprising:
    a housing;
    an outer rotor having radially inward-facing projections, the inner outer rotor being mounted on a first bearing for rotation relative to the housing about a first axis defined by the first bearing; and
    an inner rotor having radially outward-facing projections configured to mesh with the radially inward-facing projections of the outer rotor, the inner rotor being mounted on a second bearing for rotation relative to the housing about a second axis defined by the second bearing, the second axis being parallel to and offset from the first axis;
    the inward-facing projections of the outer rotor at least in part defining variable volume chambers between the inward-facing projections of the outer rotor;
    the inward-facing projections of the outer rotor and the outward-facing projections of the inner rotor intermeshing at a top dead center (TDC) portion of the pump or motor; and
    the inner rotor including at least one axially outer surface configured to seal against a corresponding axially inner surface of the outer rotor, the at least one axially outer surface of the inner rotor defining a proud portion to seal against the corresponding axially inner surface of the outer rotor;
    in which the proud portion defines discontinuous grooves.

4. An internal gear pump, internal gear pump compressor, internal gear pump expander, or internal gear hydraulic motor comprising:
    a housing;
    an outer rotor having radially inward-facing projections, the inner outer rotor being mounted on a first bearing for rotation relative to the housing about a first axis defined by the first bearing; and
    an inner rotor having radially outward-facing projections configured to mesh with the radially inward-facing projections of the outer rotor, the inner rotor being mounted on a second bearing for rotation relative to the housing about a second axis defined by the second bearing, the second axis being parallel to and offset from the first axis;
    the inward-facing projections of the outer rotor at least in part defining variable volume chambers between the inward-facing projections of the outer rotor;
    the inward-facing projections of the outer rotor and the outward-facing projections of the inner rotor intermeshing at a top dead center (TDC) portion of the pump or motor; and
    the inner rotor including at least one axially outer surface configured to seal against a corresponding axially inner surface of the outer rotor, the at least one axially outer surface of the inner rotor defining a proud portion to seal against the corresponding axially inner surface of the outer rotor in which the proud portion is configured to wear against the corresponding axially inner surface of the outer rotor;
in which the at least one axially outer surface of the inner rotor is formed of plastic; and
in which the plastic is polyetheretherketone (PEEK).

* * * * *